US007958077B2

(12) United States Patent
Vescovi et al.

(10) Patent No.: US 7,958,077 B2
(45) Date of Patent: Jun. 7, 2011

(54) RULES ENGINE FOR ENTERPRISE SYSTEM

(75) Inventors: Marcos Vescovi, Aptos, CA (US);
Christian Hagmann, Foster City, CA (US)

(73) Assignee: Paymo, Inc., San Francisco, CA (US)

( * ) Notice: Subject to any disclaimer, the term of this patent is extended or adjusted under 35 U.S.C. 154(b) by 1097 days.

(21) Appl. No.: 11/625,084

(22) Filed: Jan. 19, 2007

(65) Prior Publication Data
US 2008/0177690 A1    Jul. 24, 2008

Related U.S. Application Data

(60) Provisional application No. 60/760,098, filed on Jan. 19, 2006.

(51) Int. Cl.
*G06N 5/02*        (2006.01)
(52) U.S. Cl. .............................. 706/48; 719/314; 705/1.1
(58) Field of Classification Search .................... 706/48; 719/314; 705/1.1; 707/999.101
See application file for complete search history.

(56) References Cited

U.S. PATENT DOCUMENTS

| | | | |
|---|---|---|---|
| 5,230,061 A * | 7/1993 | Welch | 706/46 |
| 6,415,275 B1 * | 7/2002 | Zahn | 706/47 |
| 6,865,566 B2 | 3/2005 | Serrano-Morales et al. | |
| 6,965,889 B2 | 11/2005 | Serrano-Morales et al. | |
| 6,993,514 B2 | 1/2006 | Majoor | |
| 7,152,053 B2 | 12/2006 | Serrano-Morales et al. | |
| 7,603,358 B1 * | 10/2009 | Anderson et al. | 1/1 |
| 2002/0091539 A1 * | 7/2002 | Yin et al. | 705/1 |
| 2002/0147726 A1 * | 10/2002 | Yehia et al. | 707/101 |
| 2004/0002958 A1 * | 1/2004 | Seshadri et al. | 707/3 |
| 2004/0034848 A1 * | 2/2004 | Moore et al. | 717/117 |
| 2004/0176968 A1 * | 9/2004 | Syed et al. | 705/1 |

OTHER PUBLICATIONS

"Java Message Service API Tutorial", Kim Haase, Sun Microsystems, Inc., 2002, pp. 1-278.*
"XML Based Message Queuing", Lan Ye, Yong Luo, Motoyasu Nagata, IEEE International Conference on Systems, Man, and Cybernetics, vol. 3, 2000, pp. 2034-2039.*

* cited by examiner

*Primary Examiner* — David R Vincent
*Assistant Examiner* — Mai T Tran
(74) *Attorney, Agent, or Firm* — Greenberg Traurig, LLP

(57) ABSTRACT

An example embodiment provides a process relating to an inference engine for enterprise systems and enterprise contracts. In the example, the inference engine receives a fact and stores it in an input queue. Then the inference engine retrieves the fact from the input queue and routes the fact to a schedule queue on the basis of the fact's processing schedule and a condition that is part of a rule. The inference engine retrieves the fact from the schedule queue in accordance with the processing schedule and routes the fact to a rule executer on the basis of the fact's contents. The rule executer applies an action to the fact, where the action is also part of the rule and the action transforms the fact or creates new facts. Then the inference engine routes the transformed fact or new facts to the input queue and possibly to a persistent storage device.

26 Claims, 23 Drawing Sheets

Fig. 10     * An active term has active status and validity period verified.

* An active term has active status and verified validity period.

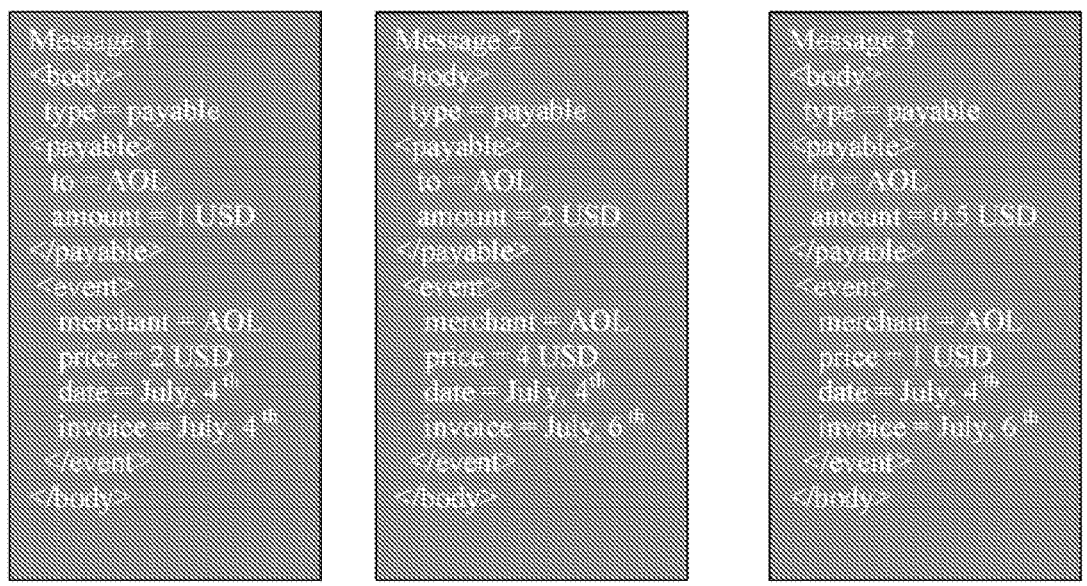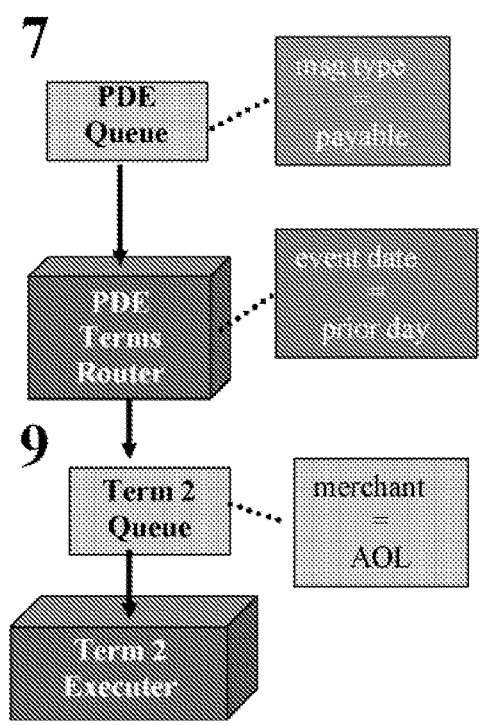
Fig. 20

RULES ENGINE FOR ENTERPRISE SYSTEM

CROSS-REFERENCE TO RELATED APPLICATIONS

This application claims the benefit of and is related to the following commonly-owned U.S. provisional patent application, whose disclosure is incorporated herein by reference in its entirety for all purposes: U.S. Provisional Application No. 60/760,098, entitled "Enterprise Rule Engine", filed on Jan. 19, 2006.

TECHNICAL FIELD

The present disclosure relates to business or inference rules engines and distributed systems.

BACKGROUND

A production system (or production rule system) is a computer program which consists primarily of a set of rules about behavior and which is used to provide some form of artificial intelligence (AI). These rules, termed productions, are a basic representation found useful in AI planning, expert systems, and action selection. A production system provides the mechanism to execute productions in order to achieve some goal for the system.

Typically, productions consist of two parts: a sensory precondition (or "IF" statement) and an action (or "THEN"). If a production's precondition matches the current state of knowledge, then the production is said to be triggered. If a production's action is executed, it is said to have fired. A typical production system also contains a database, sometimes called working memory, which maintains data about current state or knowledge, and a rule interpreter. The rule interpreter usually provides a mechanism for prioritizing productions when more than one is triggered. Rule interpreters generally execute a forward chaining algorithm for selecting productions to execute to meet current goals, which can include updating the system's data or knowledge. The condition portion of each rule (left-hand side or LHS) is tested against the current state of the working memory.

Idealized or data-oriented production systems often assume that any triggered conditions will be executed, e.g., that the consequent actions (right-hand side or RHS) will update the agent's knowledge, removing or adding data to the working memory, if nothing else. The system stops processing either when the user interrupts the forward chaining loop, when a given number of cycles has been performed, when a "halt" RHS is executed, or when no rules have true LHSs. Real-time systems, in contrast, often will choose between mutually exclusive productions; since actions take time, only one action can be taken. In such systems, the rule interpreter, or rules engine (also called inference engine), cycles through two steps: (a) matching production rules against the database, followed by selecting which of the matched rules to apply; and (b) executing the selected actions. In many instances, the rules or inference engine is a separate component of a larger program or application.

Production systems may vary on the expressive power of conditions in production rules. Accordingly, the pattern matching algorithm which collects production rules with matched conditions may range from the naïve, in which rules are tried in sequence and until the first match, to the optimized, in which rules are "compiled" into a network of inter-related conditions. The latter is illustrated by the RETE algorithm, designed by Charles L. Forgy in 1983, which is used in a series of production systems, called OPS and originally developed at Carnegie Mellon University culminating in OPS5 in the early eighties.

A computer cluster is a group of loosely coupled computers that work together so closely that they can be viewed as though they are a single computer. The components of a cluster are commonly, but not always, connected to each other through local area networks. Clusters are usually deployed to improve performance and/or availability over that provided by a single computer, while typically being much more cost-effective than single computers of comparable speed or availability.

High-availability (HA) clusters are implemented primarily for the purpose of improving the availability of the services which the cluster provides. They operate by having redundant nodes, which are then used to provide service when system components fail. HA cluster implementations attempt to manage the redundancy inherent in a cluster to eliminate single points of failure. Load-balancing clusters operate by having all workload come through one or more load-balancing front ends, which then distribute it to a collection of back end servers. Although they are primarily implemented for improved performance, they commonly include high-availability features as well. Such a cluster of computers is sometimes referred to as a server farm. High-performance clusters (HPC) are implemented primarily to provide increased performance by splitting a computational task across many different nodes in the cluster and are most commonly used in scientific computing. Such clusters commonly run custom programs which have been designed to exploit the available parallelism. HPC clusters are optimized for workloads which require active communication between jobs or processes Turning on separate computer nodes during the computation. These include computations where intermediate results from one node's calculations will affect future calculations on other nodes.

SUMMARY

In particular embodiments, the present invention provides methods, apparatuses, and systems directed to the creation of a business or inference rules engine that executes in an enterprise environment which might comprise a distributed system.

BRIEF DESCRIPTION OF THE DRAWINGS

FIGS. 16, 17, 18, 19, 20, 21, and 22 show a use case, which might be used with a contract-execution engine, in some embodiments of the present invention.

DESCRIPTION OF EXAMPLE EMBODIMENTS)

The following example embodiments are described and illustrated in conjunction with apparatuses, methods, and systems which are meant to be examples and illustrative, not limiting in scope.

A. Distributed Computing System or Cluster

Figure 1:
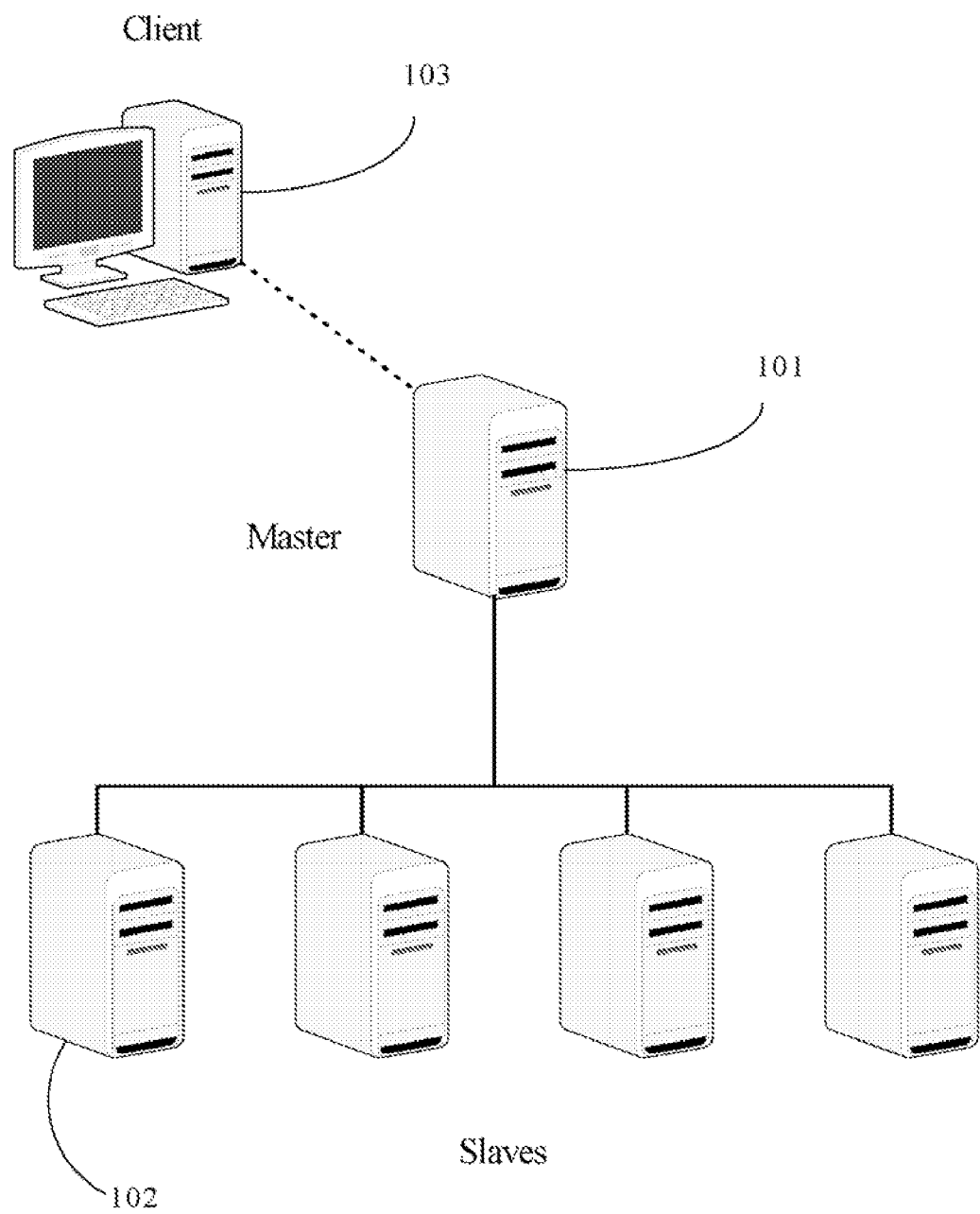
FIG. 1 is a diagram showing an example distributed computing system or cluster, which might be used with an embodiment of the present invention.

FIG. 1 illustrates an example distributed computing system, consisting of one master server 101, four slave servers 102, and a client 103, which system might be used to run a rules engine in some embodiments. The distributed computing system comprises a cluster of servers in which the slave servers are typically called nodes. Though only four nodes are shown in FIG. 1, the number of nodes might well exceed dozens in some embodiments. Ordinarily, nodes in a cluster are redundant, so that if one node crashes while performing a particular application, the cluster software can restart the application on one or more other nodes.

Multiple nodes also facilitate the parallel processing of a large database, including the "working memory" of a rules engine. In some embodiments of the present invention, a master server, such as 101, might receive a rules-engine job (e.g., a set of production rules to be checked against working memory) from a client, such as 103, and then assign tasks resulting from that job to slave servers or nodes, such as servers 102, which do the actual work of executing the assigned tasks upon instruction from the master and which move data between tasks. Likewise, in some embodiments of the present invention, a master server, such as server 101, governs the distributed file system needed to support parallel processing of large databases. In particular, the master server manages the file system's namespace and block mapping to nodes, as well as client access to files, which are actually stored on slave servers or nodes, such as 102. In turn, in some embodiments, the slave servers do the actual work of executing read and write requests from clients, such as 103, and perform block creation, deletion, and replication upon instruction from the master server.

Figure 2:
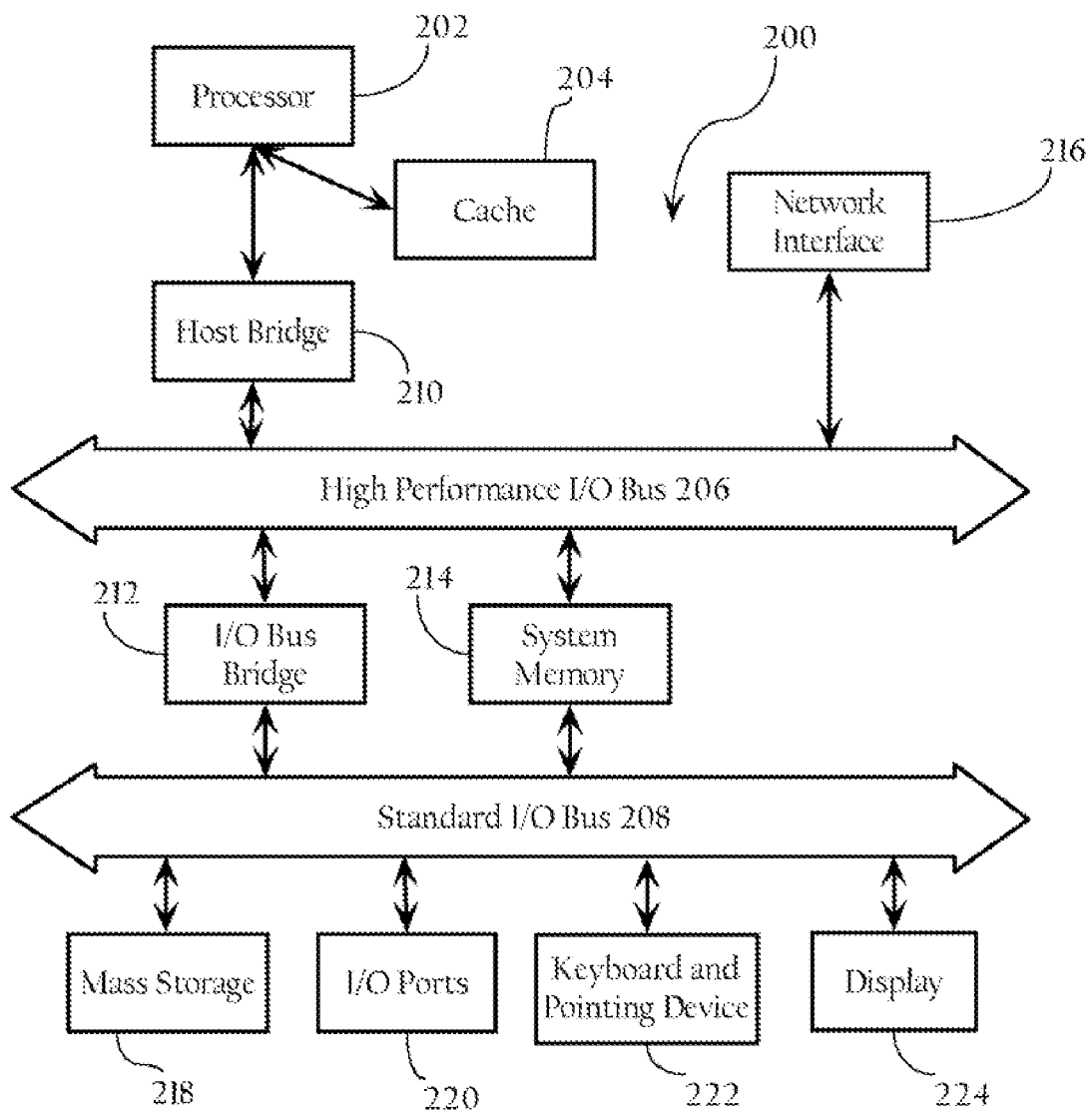
FIG. 2 is a diagram showing a system architecture for a rules-engine server, which might be used with the present invention in particular embodiments.

FIG. 2 illustrates, for didactic purposes, a hardware system 200, which might be used as a server in a cluster or a standalone server that runs the rules engine described below, in particular embodiments. Additionally, FIG. 2 might illustrate a client that runs an application program that uses the rules engine. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Linux operating system. However, the present, invention may be used with other suitable operating systems, such as the Window's® 95/98/NT/XP operating system, available from Microsoft Corporation of Redmond, Wash., the Apple Macintosh Operating System, available from Apple Computer Inc. of Cupertino, Calif., UNIX operating systems, and the like.

B. Rules Engine's Components and Processes

As noted above, a rule is an "If-Then" statement where the "If" part corresponds to the condition and the "Then" part corresponds to the action of the rule. A rules engine is an inference engine that executes rules against a set of "facts" or data set. When a rule condition matches a fact, the rules engine applies the rule action to the fact, generating new facts that, become available to the rule engine for further processing. The process continues until no rules match the existing facts or other end conditions apply. In the case of real-time continuous operation, the rules engine continuously processes facts as they enter the rule engine in real-time.

Figure 3:
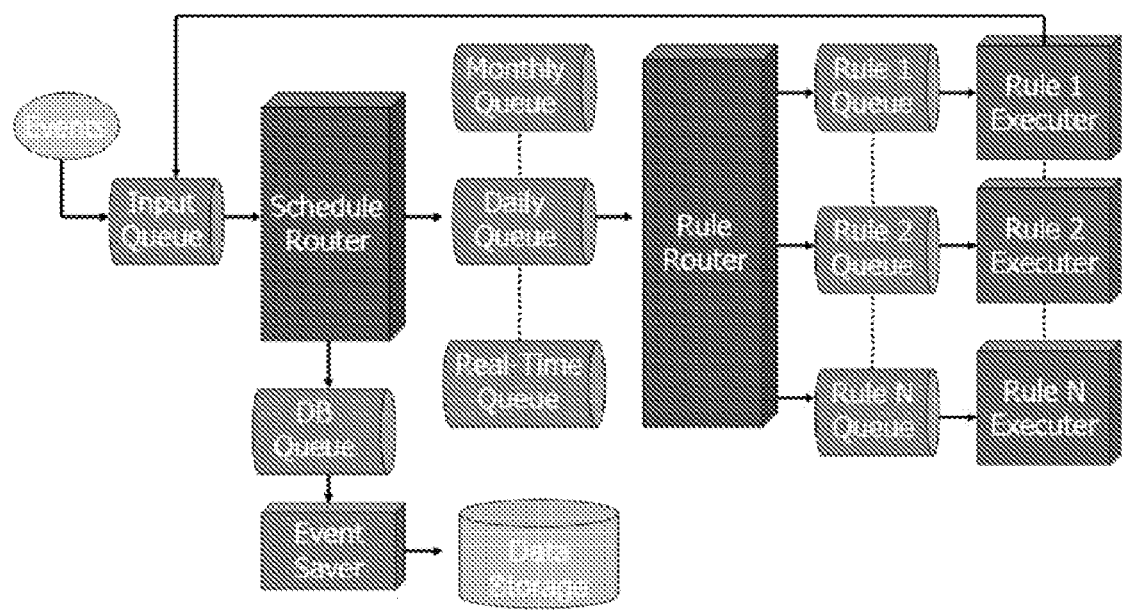
FIG. 3 is a diagram showing the main components of a rules engine, which might be used in some embodiments of the present invention.

FIG. 3 is a diagram showing the main components of a rules engine, which might be used in some embodiments of the present invention. As shown in FIG. 3, the rules engine comprises: (a) a schedule router; (b) a rule router; (c) a rule executer; and (d) an event saver. Also as shown in FIG. 3, a main component of the rules engine is the "queue" (see e.g., the Input Queue, the DB (database) Queue, the Monthly Queue, the Daily Queue, the Real-Time Queue, and the Rule 1, Rule 2, and Rule N Queues). In particular embodiments, the rules engine uses JMS (Java Messaging System) queues, which can be implemented in memory or disk and which facilitate asynchronous operation of the other components of the rules engine. (The JMS API is a Java Message Oriented Middleware (MOM) API for sending messages between two or more clients. JMS is a specification developed under the Java Community Process as JSR 914.) As indicated above, the rules engine's queues can be deployed in a single machine or on multiple machines in a cluster.

Figure 4:
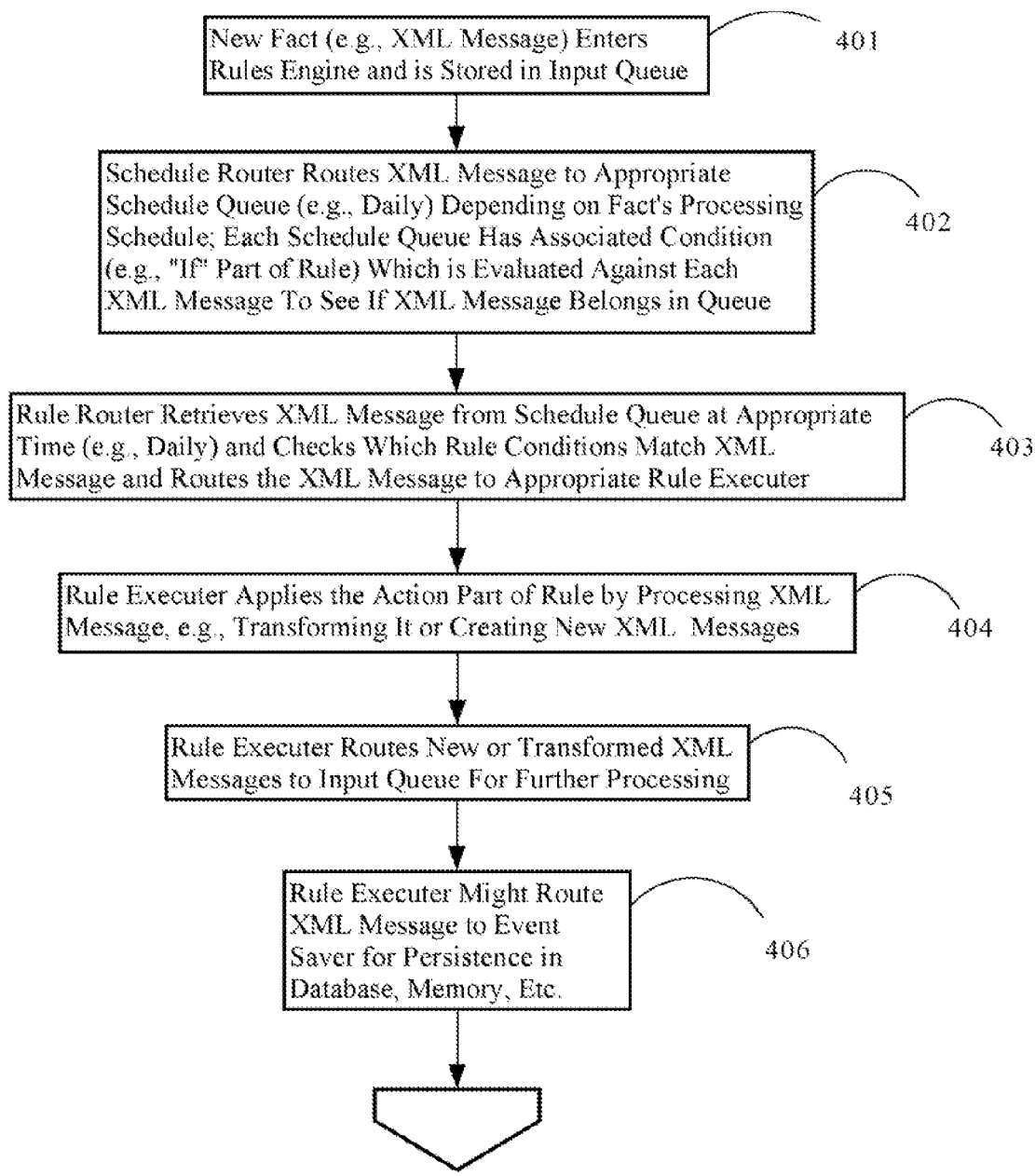
FIG. 4 is a diagram showing a flowchart of a process which a rules engine might use to process an XML message, in some embodiments of the present invention.

In particular embodiments, the rules engine uses XML messages to represent "facts" and Java methods to represent "rules". FIG. 4 is a diagram showing a flowchart of a process which a rules engine might use to process an XML message, in some embodiments of the present invention. In the process's first step 401, a new fact represented by an XML message enters the rules engine and is stored in the Input Queue. In the process's next step 402, the Schedule Router routes the XML message to the appropriate Schedule Queue (e.g., Real-Time, Daily, Weekly, Monthly, etc.), depending on the message's processing schedule, e.g., whether the message will be processed in real-time, on a daily, weekly, or monthly basis and so on. Each Schedule Queue has an associated Condition (e.g., an if part of a rule) that is evaluated against each XML message to check whether the XML message belongs in the Schedule Queue.

In step 403 of the process, the Rule Router retrieves the XML message from the Schedule Queue at the appropriate time (e.g., real-time, daily, weekly, monthly, etc.) and checks which rule conditions match the XML message. When performing this check, the rules engine uses various strategies to test only the relevant rules and thereby optimize performance. Once the check is performed, the Rule Router completes step 403 by routing the XML message to the appropriate Rule Executer. Here again, there are various strategies for routing the XML messages to Rule Executers, such as load balancing (in which case, the same rule might be executed on different machines) or partitioning (in which case, a specific machine might execute only a particular set of rules). It will be appreciated that domain knowledge might provide other routing strategies.

In step 404 of the process, the Rule Executer applies the Action part of the rule by processing the XML message, e.g., transforming it or creating new XML messages. Then in step 405, the Rule Executer routes the transformed or new XML messages into the Input Queue for further processing by the rules engine. Also, as shown in step 406, the Rule Executer might route the XML Message to the Event Saver component for persistence in a database, memory, or other persistence device. The Event Saver gets messages from the DB Queue and saves or updates their contents in the database.

In particular embodiments, a fact might be routed directly from the input queue to a rule executer, for real-time processing. Similarly, in particular embodiments, a fact might be routed directly from the schedule queue to a rule executer, for real-time processing. The rules engine allows for considerable flexibility with respect to real-time processing.

It will be appreciated that the above components and processes allow considerable flexibility with respect to configuration. Thus, in some embodiments, the components can be deployed in multiple machines, allowing for horizontal and vertical scalability. Further, the use of queues provides an easy way to configure where the rules engine's components might be deployed. Also, in some embodiments, the rules engine might comprise various schemas for routing messages and load balancing according to various criteria which might be easily configured.

Additionally, it will be appreciated that the rules engine's use of queues enables the fully asynchronous processing desired for performance and scalability in enterprise applications. Thus, each process can perform its task and route XML messages into the appropriate queues, without waiting for any subsequent process. In this regard, it will also be appreciated that the rules engine executes scheduled events at appropriate times, through the use of queues. That is, some XML messages are only executed at specific times (or in real-time). Each of these messages is stored in its associated schedule queue until execution time.

Similarly, in particular embodiments, the rules engine might use completely transactional processing. That is to say, an XML message retrieved from a queue by a rules engine component is committed only when the message's processing is over and the resulting XML messages are put into other queues. Consequently, in the case of a crash, the rules engine does not perform the commit and the XML message remains in its original queue.

It will further be appreciated that each rules engine component might be given a processing power (e.g., by running the component on specific hardware/software or assigning the component a certain number of threads, etc.) to improve quality of service, in particular embodiments. For example, a particular set of rules might retrieve XML messages out of a queue and be given a larger number of threads for their execution.

Likewise, in particular embodiments, the rules engine can handle peak processing times without the loss of XML messages by storing a high volume of XML messages in queues for later retrieval, routing, and execution, when processing resources are available. And in particular embodiments, the rules engine might contain connectors allowing rules to request web services or the rules engine itself might provide such services.

C. Contract-Execution Engine's Model

A particular embodiment of the rules engine is called the contract execution engine, which implements a contractual model in the following way. A contract represents the legal agreement between participants (which might be businesses or people). Each contract has multiple terms (or clauses). Each term is fulfilled by a selector and a plan. The selector corresponds to the "If" conditional part of a rule and the plan corresponds to the "Then" action part of the rule. In other words, a term is fulfilled by a rule.

The participants are the entities participating in the contracts. A participant can be of type: merchant, processor, account provider, consumer, merchant acquirer, etc. A participant can have the following status: active or inactive. Participants may have multiple relationships with other participants. A relationship is between two participants. A relationship can be of type, account provider, referrer, acquirer, etc.

A contract has multiple participants. A contract type can be: revenue-share, dynamic rating, etc. The contract type reflects the type of vertical application (e.g., an application program for a vertical or niche market which meets the needs of a particular industry) being represented by the contract. The status can be; active or inactive. A contract can have multiple terms. A term has its validity begin and end dates. The term can be of type revenue share or fee, payables consolidation, or invoicing, for example. Its status can be: active, inactive, or deleted. A term can have values associated with it. The term values are values for the parameters of the template or selector formulae but that are defined at the term level. The term "payer" or "receiver" are examples of term values. A plan template can be considered as a predefined mathematical formula for calculating payables, consolidated payables, invoices etc.

Each vertical application built on top of the contract-execution engine provides a variety of plan templates that can be used to construct plans related to the particular vertical or niche market. A plan can have the status: active and inactive. A plan defines the values for the alphanumeric parameters of its template formula. A plan may have multiple plan-sets (e.g., sets of values) and each plan-set can have multiple plan-set-values. Each plan-set-value is an attribute-value pair. The selector is a logical expression or condition used for selecting the events, payables, etc., that a term plan must apply to. The selector can have values in the same way plans have values.

A schedule specifies when a contract term must be executed. The schedule frequency can be real-time, daily, or monthly depending on whether the term should be triggered as the event, payable, etc., occurs in real-time or on a daily or monthly basis. The schedule start-time specifies at which day and at time the schedule terms should start to run.

Various contract terms are grouped into a term set. The terms of a term set are executed under the same schedule. Each term set is associated to a terms selector and a schedule selector. The terms selector specifies the set of events, payables, etc., that trigger the term set. The terms selector condition corresponds to the disjunction of the selector conditions of the terms of the term set (e.g., the union of the sets specified by each term selector condition). For example, consider Term Set $TS_i$ with Terms $T_{i,j}$ and Terms Selector Condition $TSC_i$ and each Term $T_{i,j}$ with Selector Condition $SC_{i,j}$. Then $TSC_i = (SC_{i,1}$ or $SC_{i,2}$ or . . . $SC_{i,n})$.

The schedule selector specifies the events, payables, etc., which must be selected to trigger the term set each time the schedule fires. The set specified by the schedule selector is a sub-set of the set specified by the terms selector.

In particular embodiments, the contract-execution engine predefines four term sets: RTE (Real-Time Events), PDE (Prior Day Events), PME (Prior Month Events), and PCE (Prior Cycle Events).

The attributes of Term Set RTE (Real-Time Events) are as follows: (a) schedule frequency of real-time (this schedule terms run non-stop for real-time processing); (b) schedule start-time beginning at installation time; (c) terms selector that selects all events, payables, and consolidated payables that must be processed in real-time; and (d) schedule selector that selects all events, payables, and consolidated payables that were selected by terms selector.

The attributes of Term Set PDE (Prior Day Events) are as follows: (a) schedule frequency of daily; (b) schedule start-time that usually is a delay time after midnight for coping with delayed events of the prior day; (c) terms selector that selects all events, payables, etc. that must be processed by this term set; and (d) schedule selector that selects all events, payables, etc., that were selected by the terms selector and such that the causing event occurred on the prior day.

The attributes of Term Set PME (Prior Month Events) are as follows: (a) schedule frequency of monthly; (b) schedule start-time that usually is a delay time after midnight for coping with delayed events of the prior day: (c) terms selector that selects all events, payables, etc. that must be processed by this term set; and (d) schedule selector that selects all events, payables, etc., that were selected by the terms selector and such that the causing event occurred on the prior month.

The attributes of Term Set PCE (Prior Cycle Events) are as follows: (a) schedule frequency of daily; (b) schedule start-time usually is a delay time after midnight for coping with delayed events of the prior day: (c) terms selector that selects all events, payables, etc., that must be processed by this terra set; and (d) schedule selector that selects all events, payables, etc. that were selected by the terms selector and such that the causing event cycle date was the prior day.

The event is a generic entity representing input or external events to the system. The type of an event can be purchase, rating, etc. Its status can be loaded, processed, or missed. An event is defined by a set of attribute-value pairs. The selection and selection-value entities represent such attribute-value pairs.

The trail is used for audit purposes. It links events and other concepts caused by the events such as payables etc. The trail status can be shared, reversed, etc.

To summarize, each contract in a particular embodiment of the contract-execution engine can have multiple terms. Each term is represented by a selector and a plan. The selector specifies which events, payables, etc., will trigger the plan. The execution of a plan generates new concepts (payables, consolidated payables, etc.) that can eventually trigger new contract terms. Each term set can be executed either in real-time as the events occur or based on a time schedule, e.g., they might be executed on a daily or monthly basis. The term set also defines which events or other concepts are selected for triggering the terms of the term set at the scheduled time.

D. Contract-Execution Engine's Components and Processes

Figure 5:
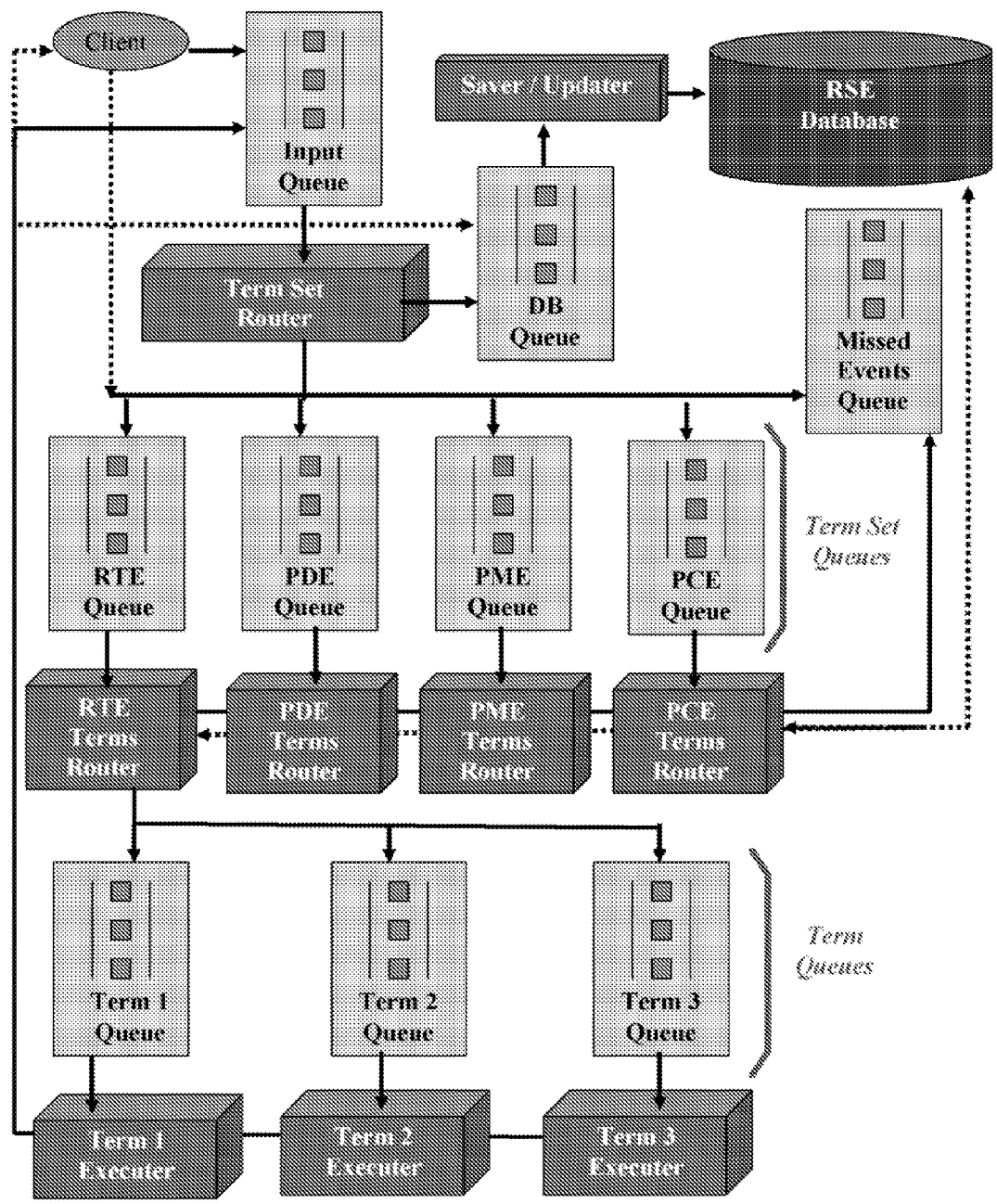
FIG. 5 is a diagram showing the components of a contract-execution engine, which might be used in some embodiments of the present invention.

FIG. 5 is a diagram showing the components of a contract-execution engine, which might be used in some embodiments of the present invention. To some extent, the contract-execution engine's components shown in FIG. 5 overlap the rules engine components shown in FIG. 3, though the latter engine is more generalized. However, as shown in FIG. 5, the contract-execution engine has more types of queues: (a) General Queues including the Input Queue, the DB Queue, and the Missed Events Queue; (b) Term Set Queues including the RTE (Real-Time Events) Queue, the PDE (Prior Day Events) Queue, the PME (Prior Month Events) Queue, and the PCE (Prior Cycle Events) Queue; (c) Term Queues including one queue per contract term and possibly an extra under-processing queue for each contract term that requires temporary intermediary calculations. These terms are called "Cumulative" Terms, in some embodiments.

Figure 6:
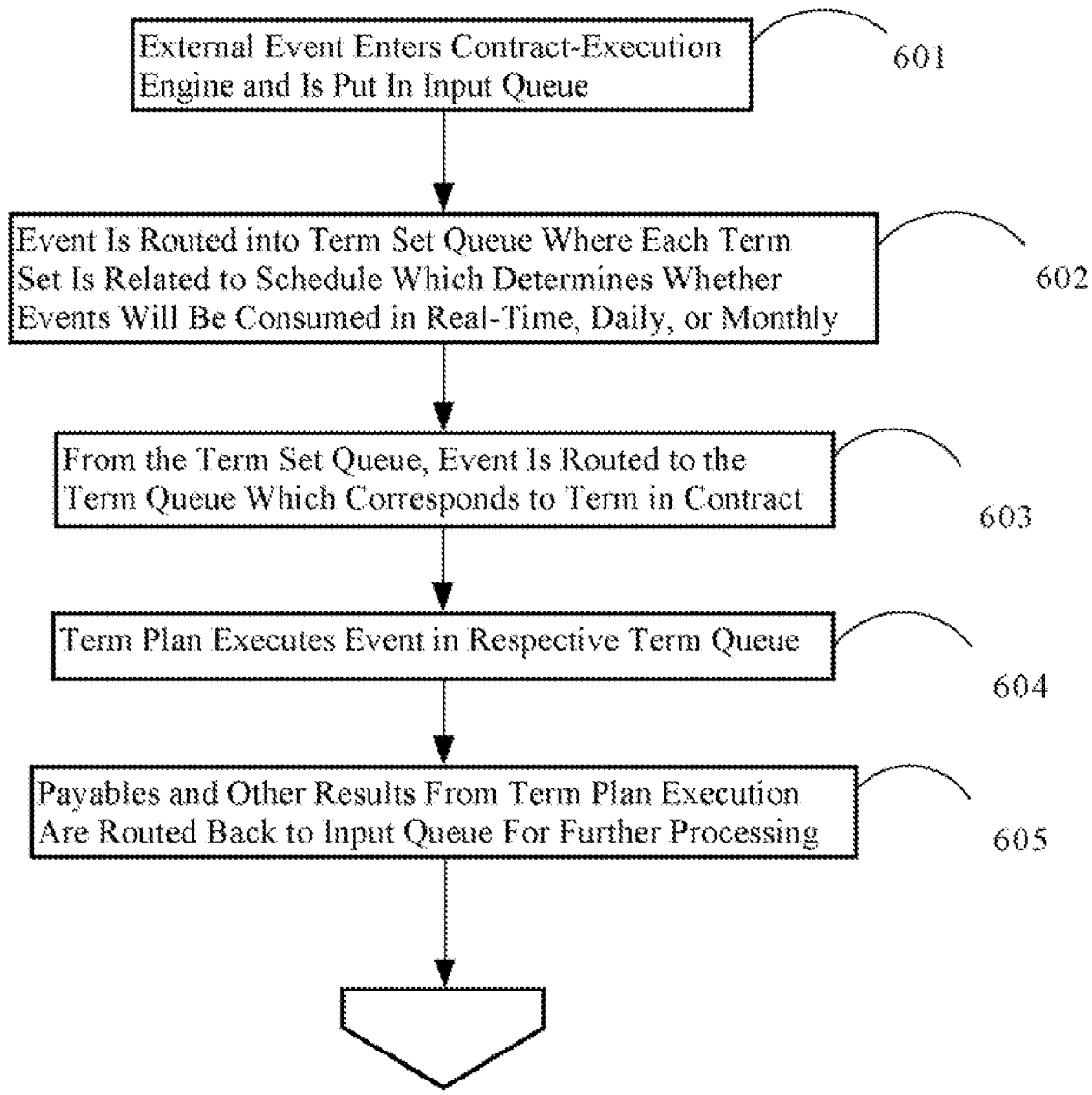
FIG. 6 is a diagram showing a flowchart of a process which a contract-execution engine might use to process an event, in some embodiments of the present invention.

As just described, the contract-execution engine has a queue-centered architecture in which the events, payables, and other data are carried by (or represented within) "messages" that go from queue to queue and get processed by the "components". FIG. 6 is a diagram showing a flowchart of a process which a contract-execution engine might use to process a message, in some embodiments of the present invention. In the first step of the process 601, an external event enters the contract-execution engine, possibly from a vertical application, and is put in the Input Queue. In the next step 602, the event is routed by the engine into a Term Set Queue, where each term set is related to a schedule. In turn, the schedule determines whether the event will be consumed in real-time, daily, or monthly. Recall from FIG. 5 that there are four pre-defined Term Set Queues (one per pre-defined Term Set) namely: RTE (Real-Time Events), PDE (Prior Day Events), PME (Prior Month Events), and PCE (Prior Cycle Events) Queues.

In step 603 of the process shown in FIG. 6, the contract-execution engine routes the events to a Term Queue which corresponds to a term in the contract (e.g., each term has a corresponding Term Queue). In step 604, the term plan executes the event in the respective Term Queue. Then in step 605, the contract-execution engine routes the payables and other results from the term plan execution back to the Input Queue and the process continues.

In a particular embodiment, messages carry the data representing the events, payables, and other concepts that are processed within the contract-execution engine. The messages are picked up from a queue by a component. The component processes the messages and/or routes the messages to other queues. The content of a message represents the latest concept processed within the contract-execution engine. During a typical life cycle (for example, in the context of a revenue sharing application), a message has the following sequence of contents: event, payable, consolidate payable, and invoice.

Figure 7:
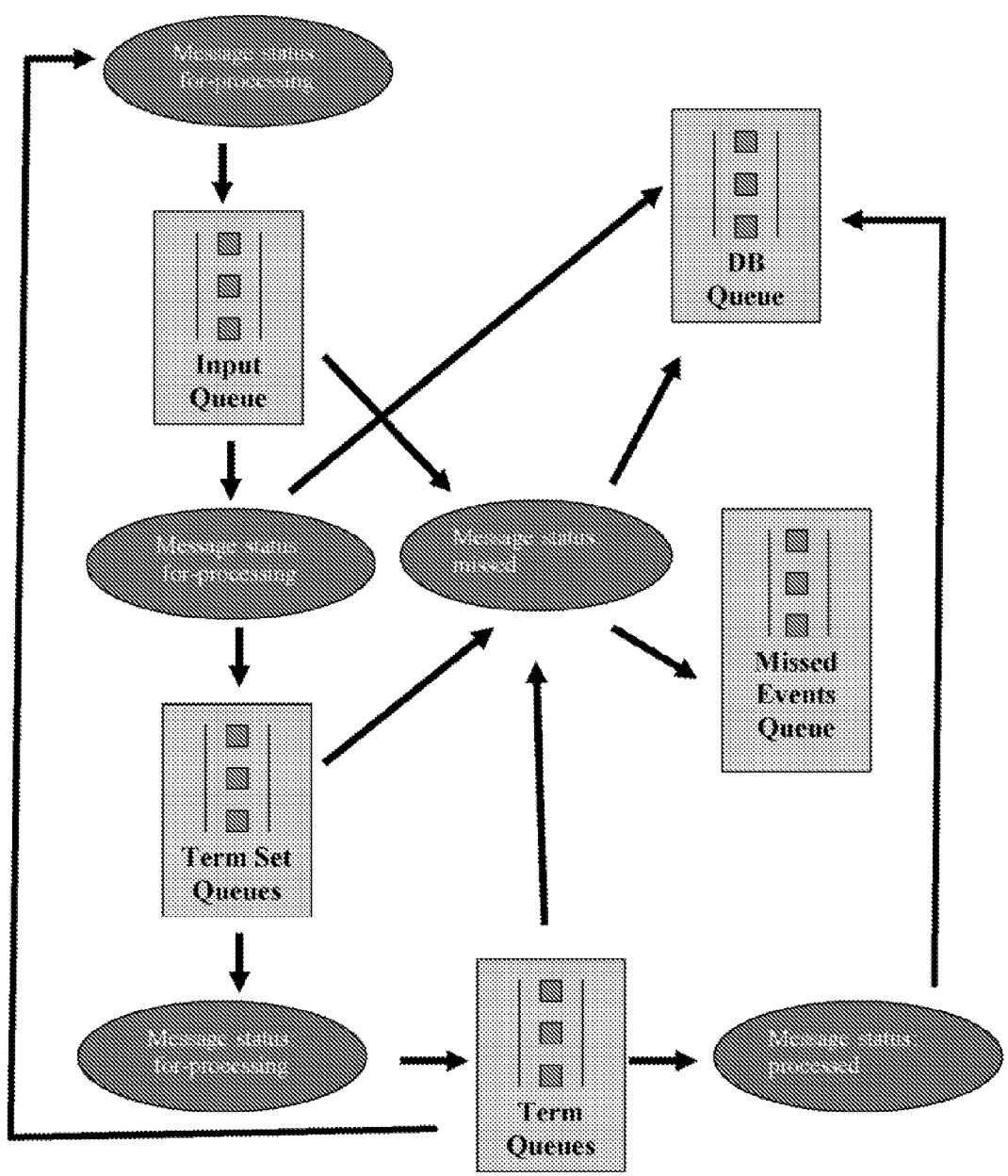
FIG. 7 is a diagram showing the flow of a message in a contract-execution engine, which flow might be used in some embodiments of the present invention.

In a particular embodiment, a message status can be: (a) for-processing (eligible for processing); (b) under-processing (during intermediary calculations); (c) processed; (d) missed; or (e) for-client. "For-processing" means that the message will get picked up and processed by a term. If the minimal processing does not occur, the message gets the status "missed". "Processed" means that the contents of the message will be saved. "For-client" means that the message will be returned to the client. FIG. 7 shows the life cycle of a message as it moves through the queues of the contract-execution engine, from "for-processing" to "missed" or "processed".

"Under-processing" means that the message is holding intermediary results. The cumulative term executer takes as input a message "for-processing", as well as an "under-processing" message. As soon as the processing is finalized (e.g., there are no more "for-processing" messages available in the Term Queue), the term executer takes the "under-processing" message and transforms it into a "for-processing", "processed", or "for-client message".

Figure 8:
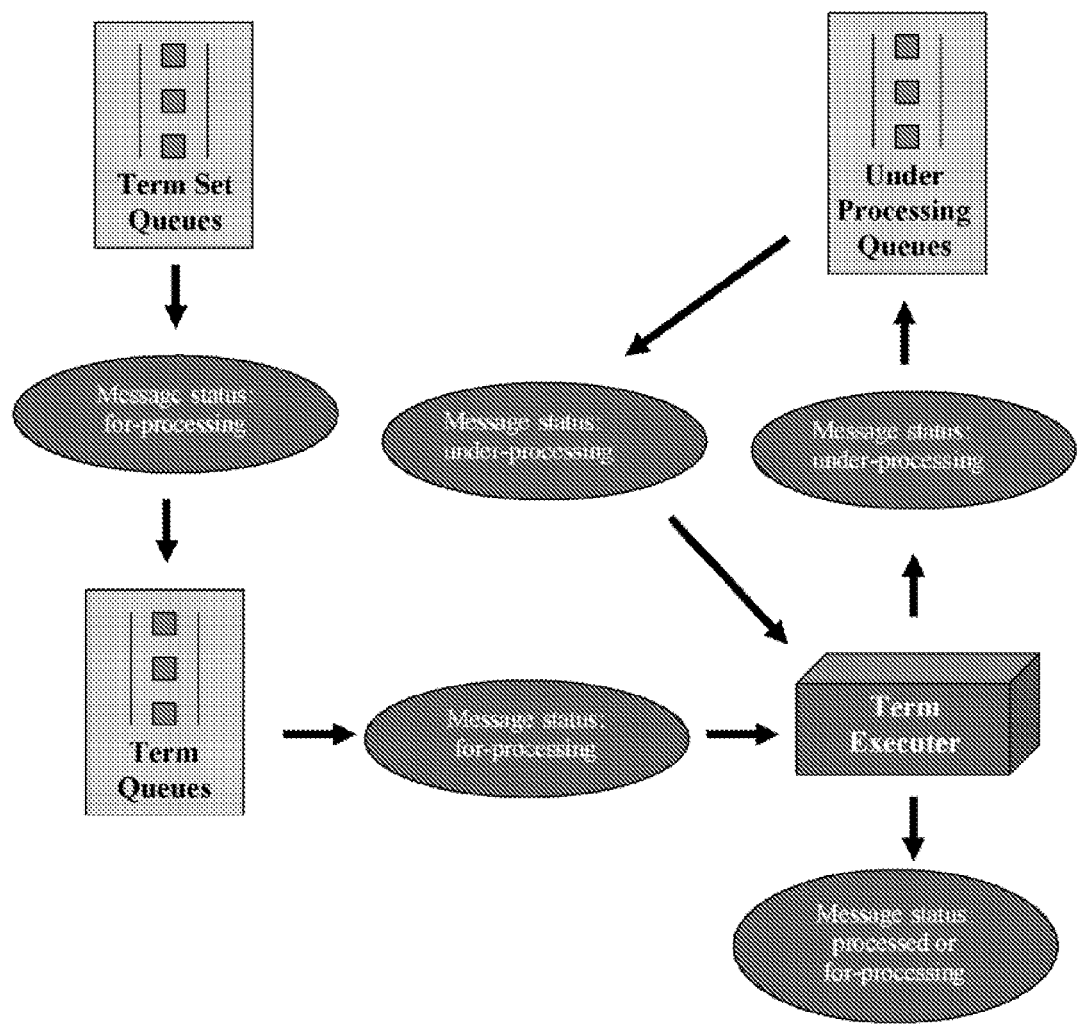
FIG. 8 is a diagram showing the flow of an "under-processing" message in a contract-execution engine, which flow might be used in some embodiments of the present invention.

Consolidation is an example of a process that requires the accumulation of results and is implemented in the contract-execution engine using "under-processing" messages. The "under-processing message" holds intermediate results and guarantees the transaction. FIG. 8 is a diagram showing the flow of an "under-processing" message in the contract-execution engine, which flow might be used in some embodiments of the present invention.

Figure 9:
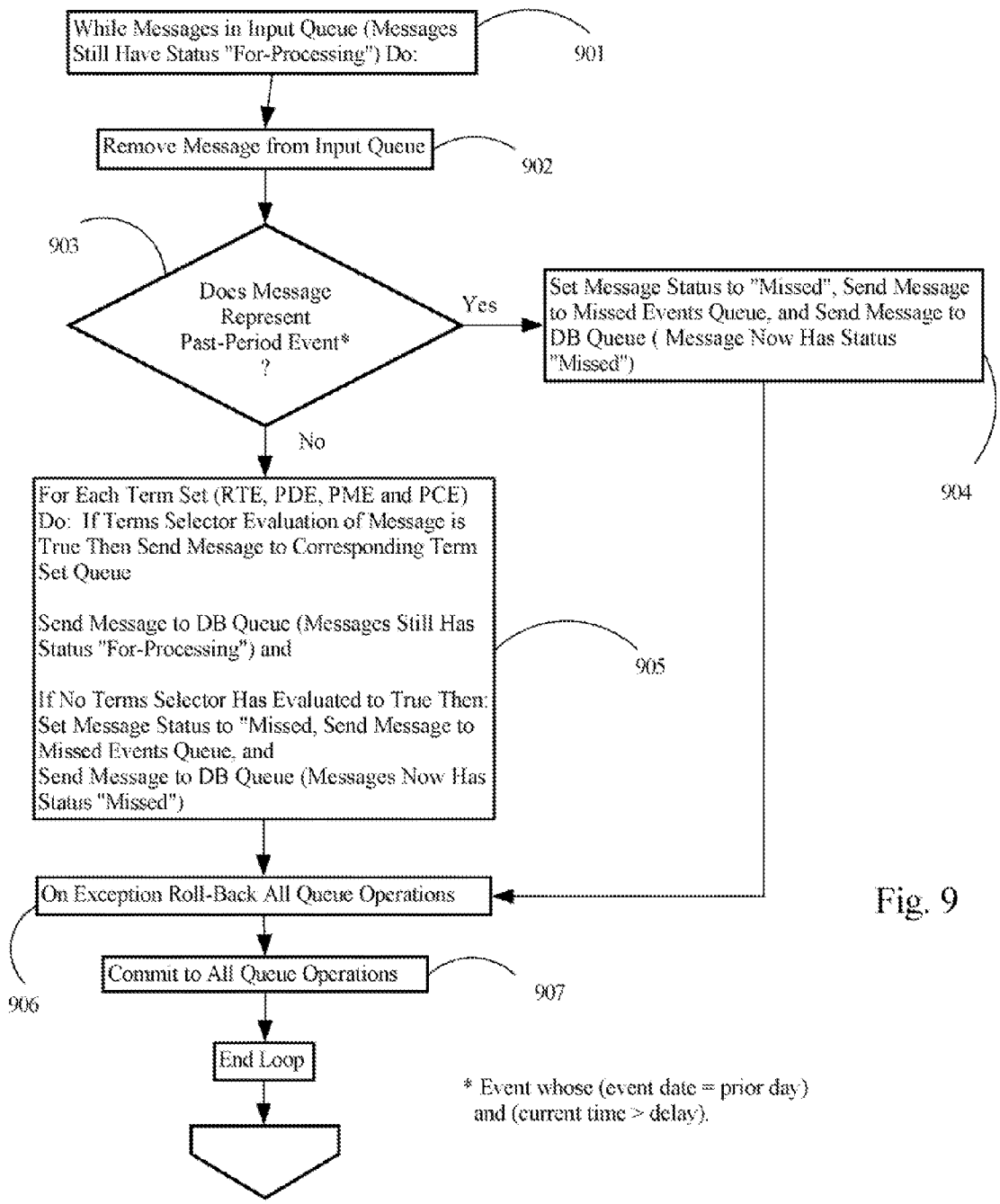
FIG. 9 is a diagram showing a flowchart of a process which might be used by a term set router in a contract-execution engine, in some embodiments of the present invention.

FIG. 9 is a diagram showing a flowchart of a process which might be used by a term set router in a contract-execution engine, in some embodiments of the present invention. In the first step of the process 901, the term set router creates a loop for processing messages, with status "For-Processing", in the Input Queue. In the next step 902, the term set router removes a message from the Input Queue and then determines, in step 903, whether the message represents a past-period event. Such an event is an event whose event date equals a prior date and whose current time is greater than any delay for the event. If the message does represent a past-period event, the term set router goes to step 904 and sets the message status to "missed", sends the message to the Missed Events Queue, and sends the message to the DB Queue (this message now has status "missed"). From step 904, the term set router goes to step 906 where all queue operations are roiled back, if an exception has occurred.

However, if the message does not represent a past period event, the term set router goes to step 905, where: (1) it loops over each Term Set (RTE, PDE, PME, and PCE) and, if the terms selector evaluation of the message is true, sends the message to the corresponding Term Set Queue; (2) sends the message to the DB Queue (the messages still has status "for-processing"); and (3) if no terms selector has evaluated to true, then set the message status to "missed" and send the message to the Missed Events Queue and send the message to the DB Queue (the message now has status "missed"). From step 905, the term set router also goes to step 906, described above. Then in step 907, the term set router commits to all queue operations. This step is the last step in the loop created in step 901.

As suggested by FIG. 9, the term set router runs non-stop. There can be multiple threads running term set routers in parallel. As long as there are messages in the Input Queue, the term set routers will process the messages.

Figure 10:
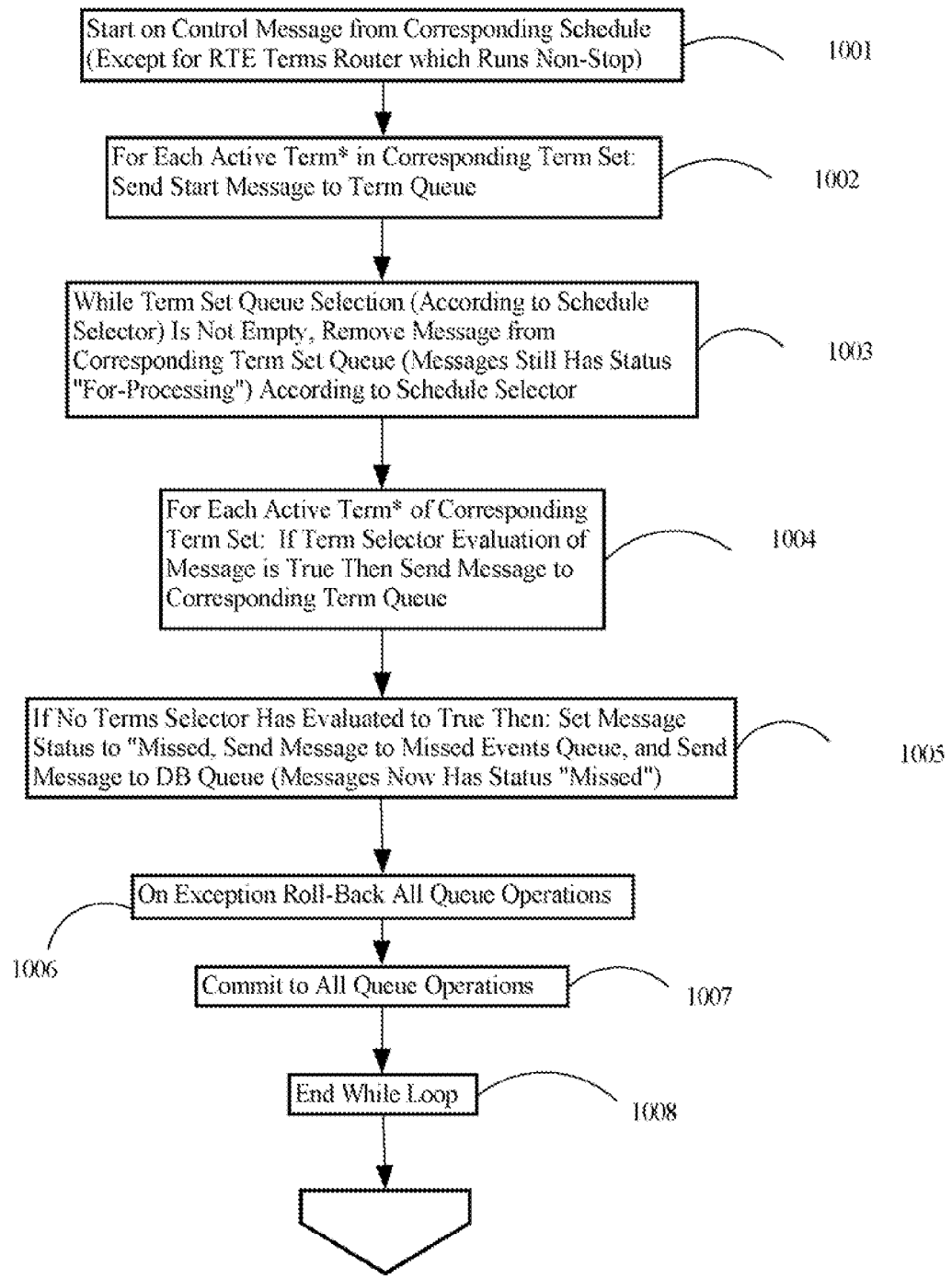
FIG. 10 is a diagram showing a flowchart of a process which might be used by a terms router in a contract-execution engine, in some embodiments of the present invention.

FIG. 10 is a diagram showing a flowchart of a process which might be used by a terms router in a contract-execution engine, in some embodiments of the present invention. There is one terms router per term set, e.g. an RTE, PDE, PME and PCE Terms Router. In step 1001 of the process, the terms router starts on a control message from the corresponding Schedule (except for the RTE Terms Router, which runs non-stop). In step 1002, the terms router loops over each active term in the corresponding term set and sends a start message to the term queue-Here, an "active term" is a term that has active status and validity period verified. In step 1003, the terms router creates a loop that runs until the term set queue selection is empty, according to the schedule selector. In this loop, the terms router begins by removing a message from the corresponding term set queue (the message still has a status of "for-processing") according to the schedule selector. Then in step 1004, the terms router loops over each active term in the corresponding term set and, if the term selector evaluation is true, sends the message to the corresponding term queue. If no terms selector has evaluated to true, then in step 1005, the terms router sets the message status to "missed" and sends the message to the Missed Events Queue and to the DB Queue (the message now has status "missed"). In step 1006, the terms router roils back all queue operations, if there has been an exception. In step 1007, the terms router commits to all queue operations. Step 1008 is the last step in the loop created in step 1003 and once this loop is finished the terms router stops.

The terms routers run according to their correspondent term set schedule. The RTE Terms Router runs non-stop, as noted above. The Period Terms Routers (PDE, PME, and PCE) are started at the end of the "current period", which is daily, monthly, and daily respectively. The Period Terms Routers send a start control message to the Term Queue of all active terms of their correspondent term set as soon as they get started. The Period Terms Routers route the messages that are specified by the schedule selector of their correspondent term set. There can be multiple threads running each terms router in parallel. As long as there are messages in the corresponding Term Set Queue (messages that have been specified by their term set schedule selector), the terms routers will process and route them to the term queues. The term set queues and terms routers improve the overall system performance since each message is tested against the selectors of terms that correspond to the particular term set as opposed to being matched against all terms.

Figure 11:
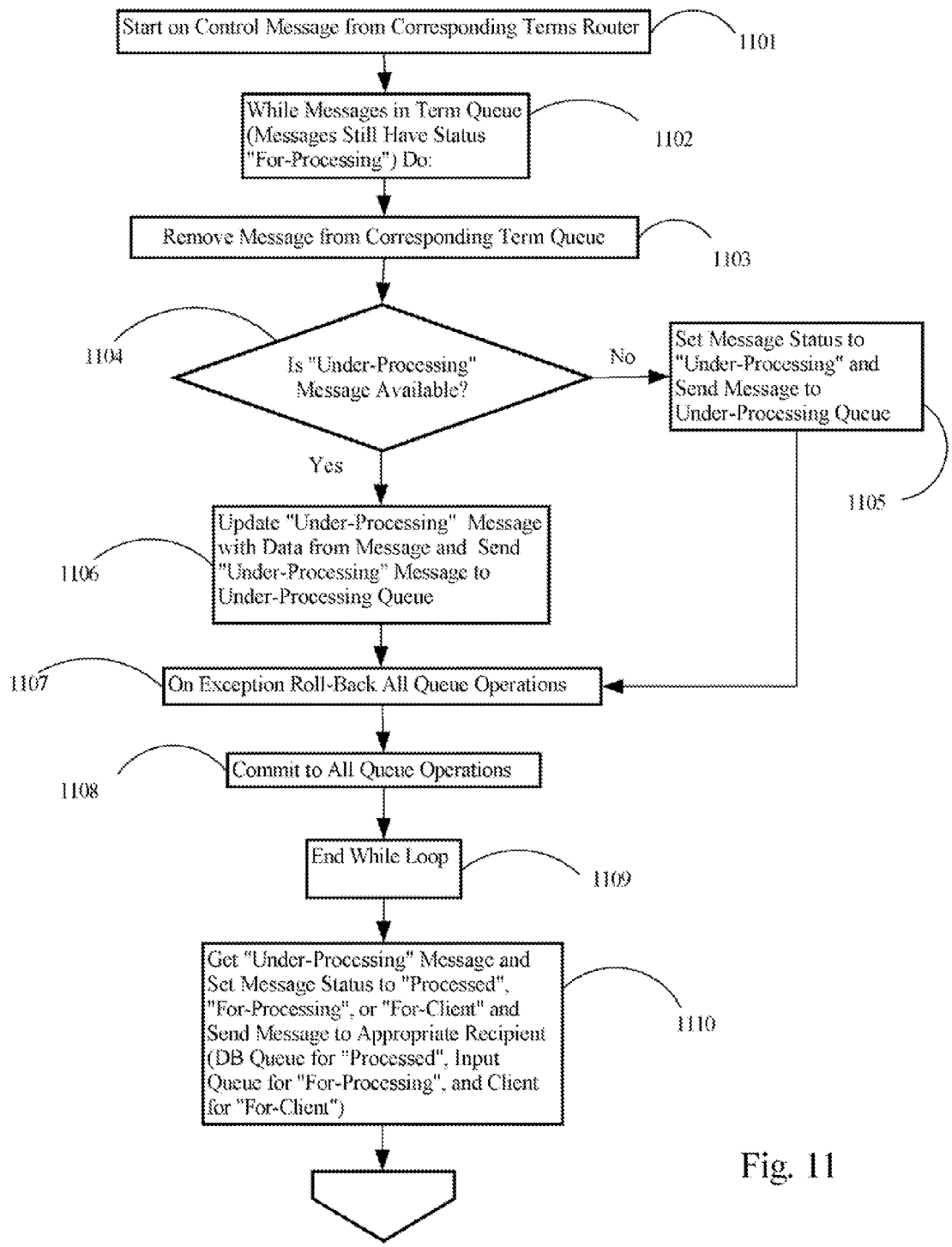
FIG. 11 is a diagram showing a flowchart of a process which might be used by a term executer in a contract-execution engine, in some embodiments of the present invention.

There is one term executer per term queue. FIG. 11 is a diagram showing a flowchart of a process which might be used by the Term Executer for Cumulative Terms in a contract-execution engine, in some embodiments of the present invention. In the first step of the process 1101, the term executor starts on a control message from corresponding Terms Router. In step 1102, the term executor creates a loop for processing messages in the Term Queue (messages still have status "For-Processing"). The loop ends when the Term Queue is empty. In step 1103 the term executor removes a message from the corresponding queue and, in step 1104, determines whether an "under-processing" message is available. If not, the term executor goes to step 1105 and sets the message status to "under-processing" and sends the message to the Under-Processing Queue. From step 1105, the term executor goes to step 1107, where all queue operations are rolled back if an exception occurs.

However, if an "under-processing" message is available at step 1104, the term executor goes to step 1106 and updates the "under-processing" message with data from the message and sends the "under-processing" message to the Under-Processing Queue. From step 1106, the term executor also goes to step 1107, described above. Then in step 1108, the term executor commits to all queue operations. This loop created in step 1102 ends in step 1109.

Once the loop has ended, the term executor goes to step 1110 and gets an "under-processing" message and sets the message's status to either "processed", "for-processing", or "for-client". Then also in this step, the term executor sends the message to the appropriate recipient, e.g., the DB Queue for a "processed" message, the Input Queue for a "for-processing" message, and the client for a "for-client" message. Then the term executor stops.

In some embodiments, there can be multiple threads running the term executer for a particular term. The term executers belonging to the RTE Term Set run non-stop. The term executors belonging to Period Term Sets are triggered by a start message sent by the corresponding term set router. They run until the corresponding term queue is empty.

In particular embodiments, the contract-execution engine caches all contract, participants, and plan data in memory and consists of a queue-based structure with one queue per contract term. In some cases, the number of contracts, participants, and plans might prevent full caching. In memory or the number of contract terms might be to numerous to allocate one queue per contract term.

Figure 12:
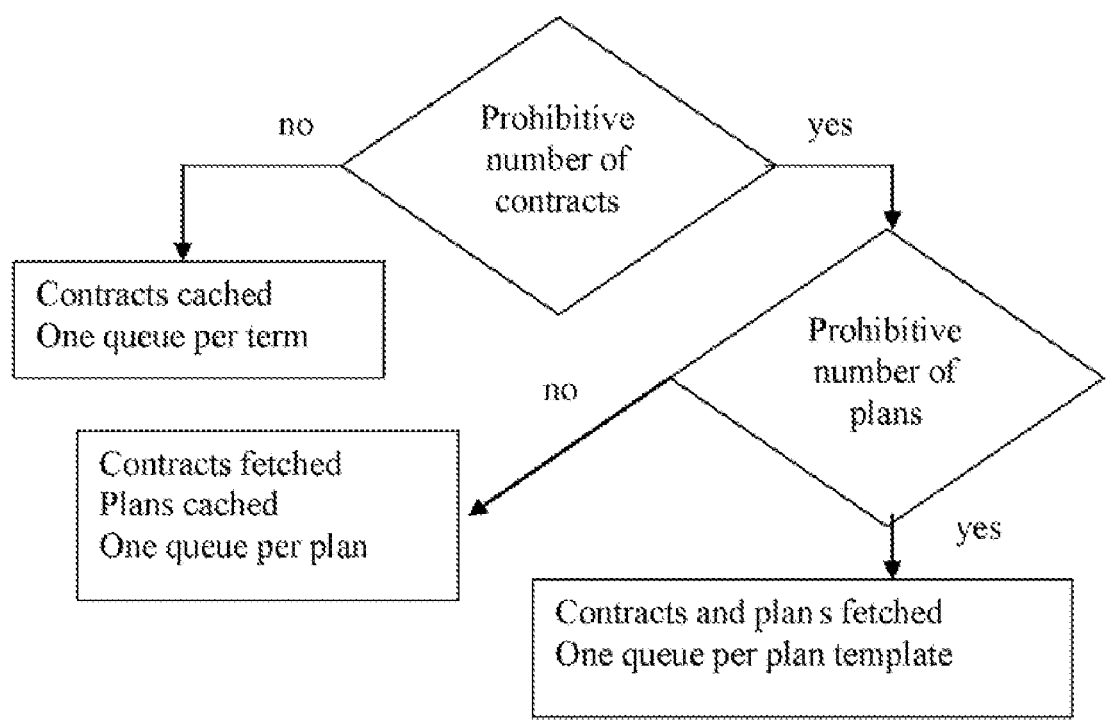
FIG. 12 is a diagram showing the flow of conditional caching in a contract-execution engine, which flow might be used in some embodiments of the present invention.

FIG. 12 is a diagram showing the flow of conditional caching in a contract-execution engine, which flow might be used in some embodiments of the present invention, to alleviate caching problems. As shown in the diagram, the contract-execution engine first determines whether there is a prohibitive number of contracts. If the number of contracts is not prohibitive, contracts are cached and queues are allocated one queue per term. But if the number of contracts is prohibitive, the contract-execution engine next determines whether the number of plans is prohibitive. If the number of plans is not prohibitive, contracts are fetched, plans are cached, and queues are allocated one queue per plan. But if the number of plans is prohibitive, contracts and plans are fetched and queues are allocated one queue per plan template.

Also in particular embodiments, the current terms router matches each message against all of the term selectors of the particular term-set, which can adversely affect the performance of the contract-execution engine. To improve performance, some rules engines (e.g., OPS-5) create a graph mapping predicates (e.g., types of the message data) to the rules that can be affected (e.g., that could be fired) by such predicates. For each new fact (e.g., message) generated, the rule engine can retrieve the potential rules by mapping the predicates of the fact using the graph. There are major advantages and drawbacks with such an approach. Among the advantages are the fact that the algorithm is very fast and that it is generic insofar as there are no assumptions about the type or semantics of the data (i.e., it works for whatever set of rules, regardless of their meaning). Among the drawbacks are the complexity of the algorithm as implemented and the potentially large size of the graph itself.

The contract-execution engine uses a different approach. In this regard, it will be appreciated that in the contract-execution engine each message carries information about all of its related participants and that the only contract terms that apply to such a message are the terms of the contracts among such message participants. Therefore, the contract-execution engine might extract the participants from the message and then retrieve the terms of the contracts of such participants.

More specifically, in particular embodiments, the terms router extracts the participants from the message and for each participant retrieves their contracts from the database and caches them in memory (if they are not already in memory). Since each participant knows about all the contracts that it participates in, it is straightforward to retrieve such contracts. The terms router then checks each contract term that belongs to the corresponding term-set. When a match occurs, it records the term plan in the message and sends it to the corresponding plan template queue.

Figure 13:
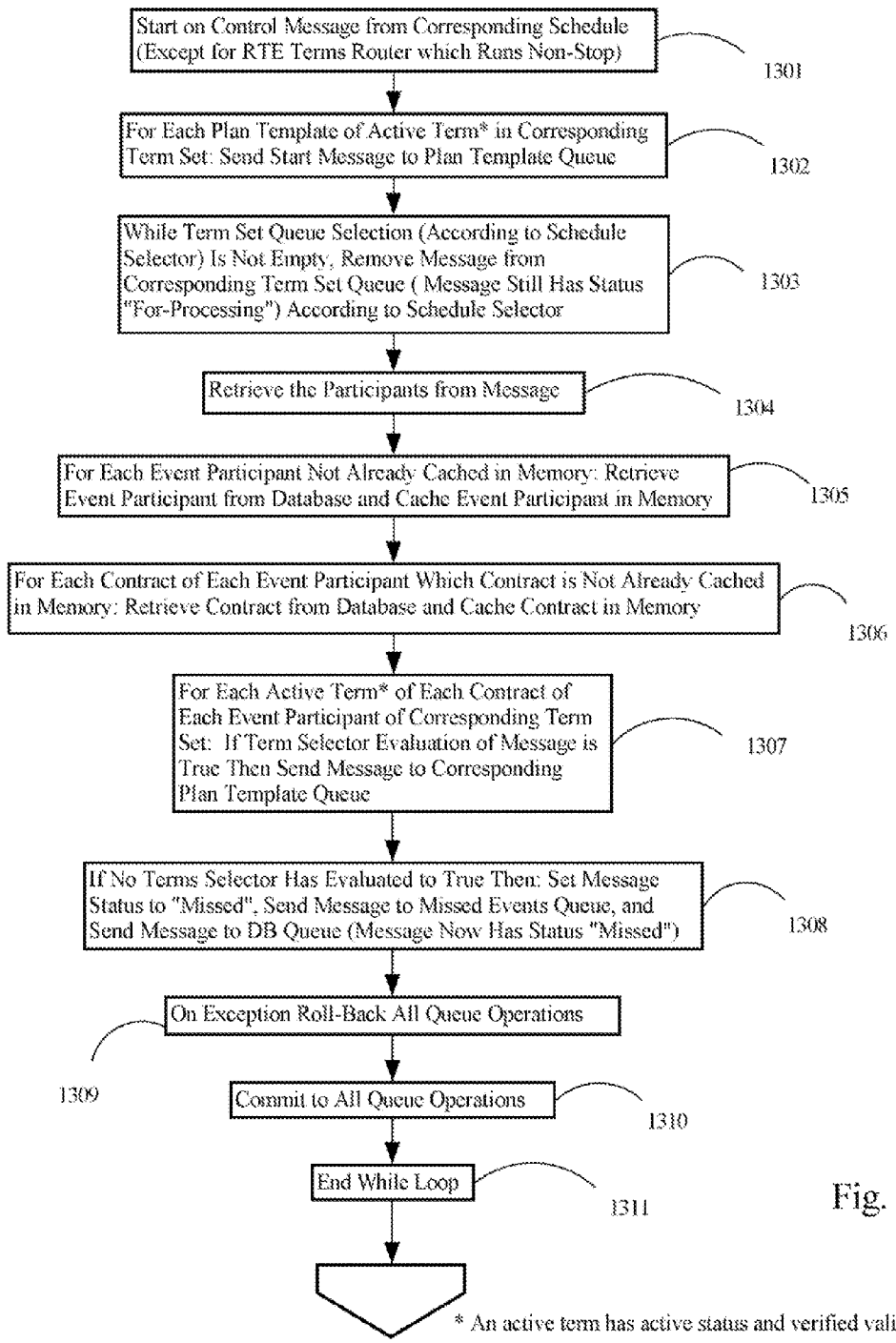
FIG. 13 is a diagram showing a flowchart of a process which might be used by an optimized terms router in a contract-execution engine, in some embodiments of the present invention.

FIG. 13 is a diagram showing a flowchart of a process which might be used by an optimized terms router in a contract-execution engine, in some embodiments of the present invention. There is one optimized terms router per term set, e.g., an RTE, PDE, PME and PCE Optimized Terms Router. In step 1301 of the process, the optimized terms router starts on a control message from the corresponding schedule (except for the RTE Terms Router, which runs non-stop). In step 1302, the optimized terms router loops over each plan template of an active term in the corresponding term set and sends a start message to the Plan Template Queue. Here again, an "active term" is a term that has active status and verified validity period. In step 1303, the optimized terms router creates a loop that runs until the Term Set Queue selection is empty, according to the schedule selector. In this loop, the optimized terms router begins by removing a message from the corresponding Term Set Queue (the message still has a status of "for-processing") according to the schedule selector. Then in step 1304, the optimized terms router retrieves the participants from the message. In step 1305, the optimized terms router loops over each event participant that is not already cached in memory and retrieves the event participant from the database and caches the event participant in memory. In step 1306, the optimized terms router loops over each contract of each event participant which contract is not already cached in memory and retrieves the contract from the database and caches the contract in memory. Then in step 1307, the optimized terms router loops over each active term of each contract of each event participant of the corresponding term set and, if the term selector evaluation is true, sends the message to the corresponding plan template queue. If no terms selector has evaluated to true, then in step 1308, the optimized terms router sets the message status to "missed" and sends the message to the Missed Events Queue and to the DB Queue (the message now has status "missed"). In step 1309, the optimized terms router rolls back all queue operations, if there has been an exception. In step 1310, the optimized terms router commits to all queue operations. Step 1311 is the last step in the loop created in step 1303 and once this loop is finished the optimized terms router stops.

Figure 14:
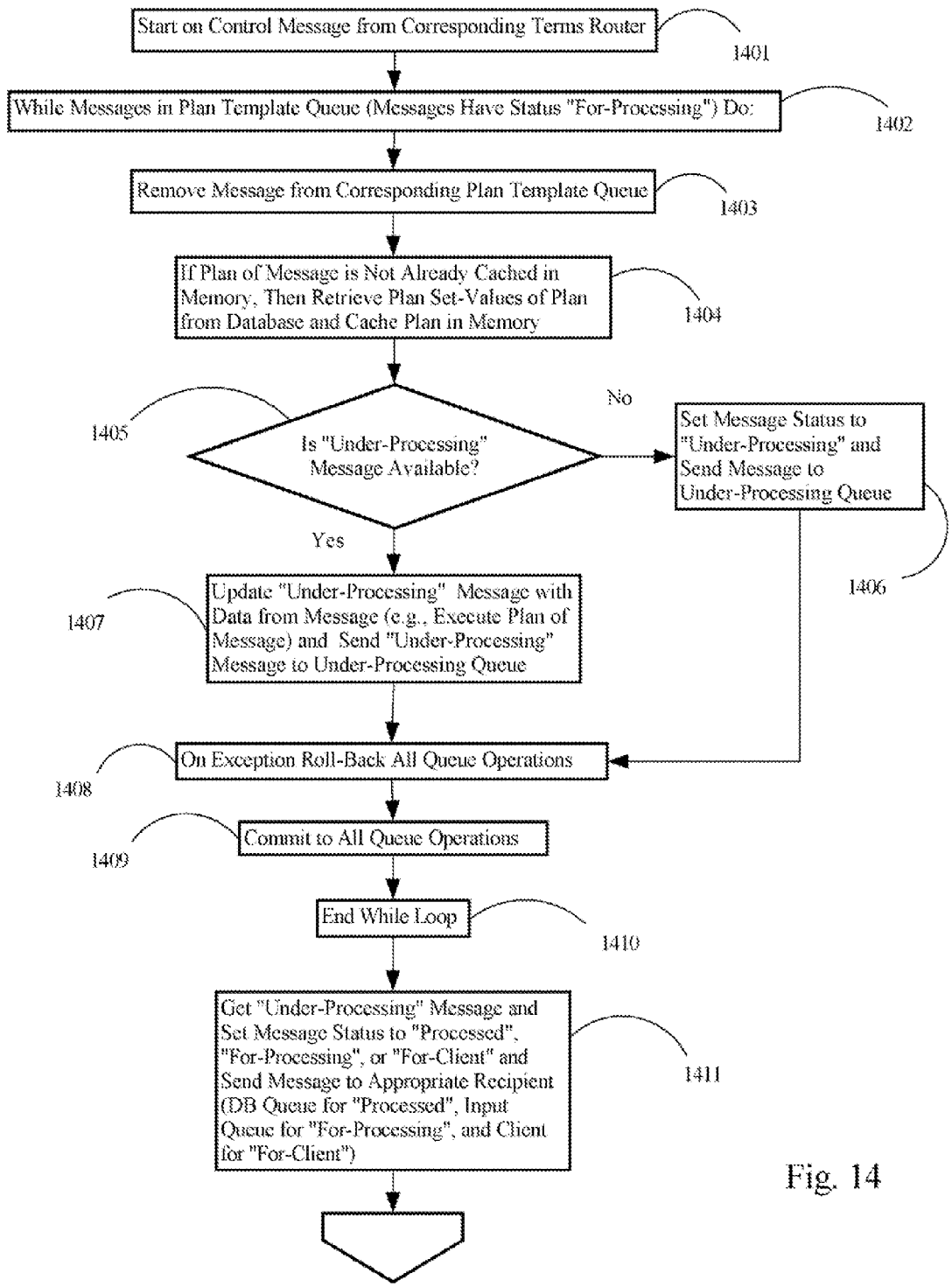
FIG. 14 is a diagram showing a flowchart of a process which might be used by an optimized term executer in a contract-execution, engine, in some embodiments of the present invention.

In particular embodiments, there is one optimized term executer per plan template queue. FIG. 14 is a diagram showing a flowchart of a process which might be used by an optimized Term Executer for Cumulative Terms in a contract-execution engine, in some embodiments of the present invention. Generally in this process, the optimized term executor checks if the plan recorded in the message is already cached in memory. If not, the optimized term executor retrieves the plan-set-values from the database and caches the plan in memory.

More specifically, in the first step of the process 1401, the optimized term executor starts on a control message from corresponding Terms Router. In step 1402, the optimized term executor creates a loop for processing messages in the Plan Template Queue (the messages will still have "For-Processing" status). The loop ends when the Plan Template Queue is empty. In step 1403, the optimized term executor removes a message from the corresponding plan template queue. Then in step 1404, the optimized term executor determines whether the plan of the message is already cached in memory and, if not, retrieves the plan set-values of the plan from the database and caches the plan in memory. In step 1405, the optimized term executor determines whether an "under-processing" message is available. If not, the optimized term executor goes to step 1406 and sets the message status to "under-processing" and sends the message to the Under-Processing Queue. From step 1406, the optimized term executor goes to step 1408, where all queue operations are rolled back if an exception occurs.

However, if an "under-processing" message is available at step 1404, the optimized term executor goes to step 1407 and updates the "under-processing" message with data from the message (e.g., executes the plan of the message) and sends the "under-processing" message to the Under-Processing Queue. From step 1407, the optimized term executor also goes to step 1408, described above. Then in step 1409, the optimized term executor commits to all queue operations. This loop created in step 1402 ends in step 1410.

Once the loop has ended, the optimized term executor goes to step 1411 and gets an "under-processing" message and sets the message's status to either "processed", "for-processing", or "for-client". Then also in this step, the optimized term executor sends the message to the appropriate recipient, e.g., the DB Queue for a "processed" message, the Input Queue for a "for-processing" message, and the client for a "for-client" message. Then the optimized term executor stops.

In particular embodiments, the mechanism for caching each entity (contract, participants, and plans) in memory is similar to a typical EJB (Enterprise JavaBean) Entity Beans mechanism. There is a configurable memory size or number of entities available for storing each type of entity. The entities are stored until the limit is reached. After that each entity is stored to the expense of another entity being removed from memory. The choice for which entity to remove may be based on quality of service associated to the entity, time, etc.

Figure 15:
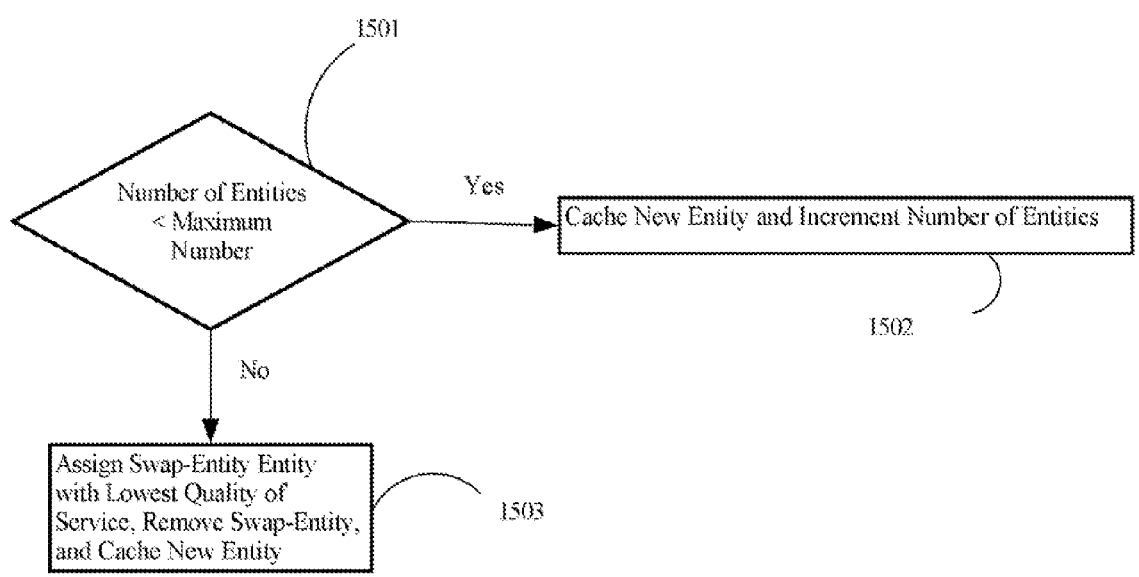
FIG. 15 is a diagram showing a flowchart of a process which might be used for caching a new entity such as a contract, participant, or plan in a contract-execution engine, in some embodiments of the present invention.

FIG. 15 is a diagram showing a flowchart of a process which might be used for caching a new entity such as a contract, participant, or plan in a contract-execution engine, in some embodiments of the present invention. In step 1501, the contract-execution engine determines whether the number of entities currently cached is less than the maximum number. If so, the contract-execution engine goes to step 1502 where it caches the new entity and increments the number of entities. Otherwise, the contract-execution engine goes to step 1503, where it (a) assigns to a swap-entity the current entity with the lowest quality of service, (b) removes the swap-entity, and (c) then caches the new entity.

It will be appreciated that an additional optimization is to have the messages associated to specific participants routed to specific servers which are devoted to executing the contracts of such participants.

Figure 16:
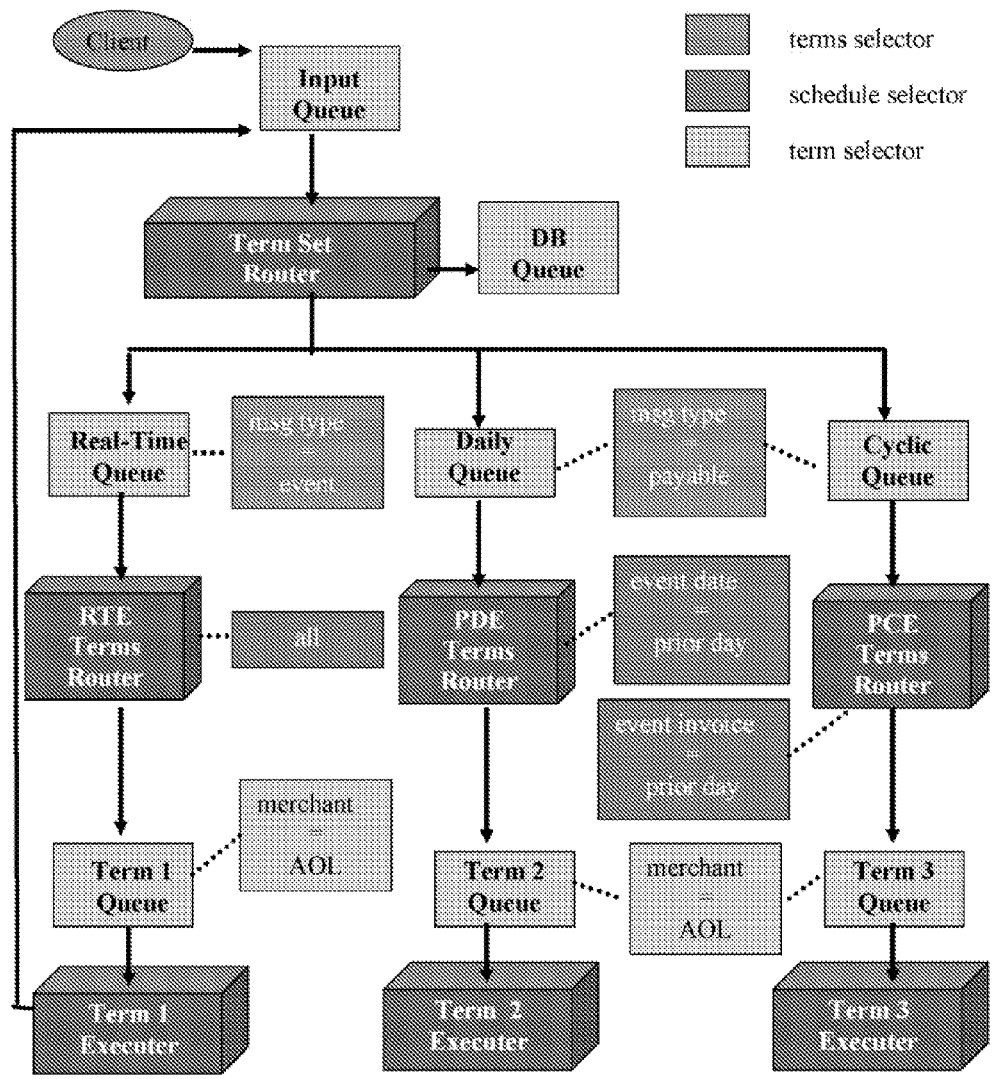
Figure 17:
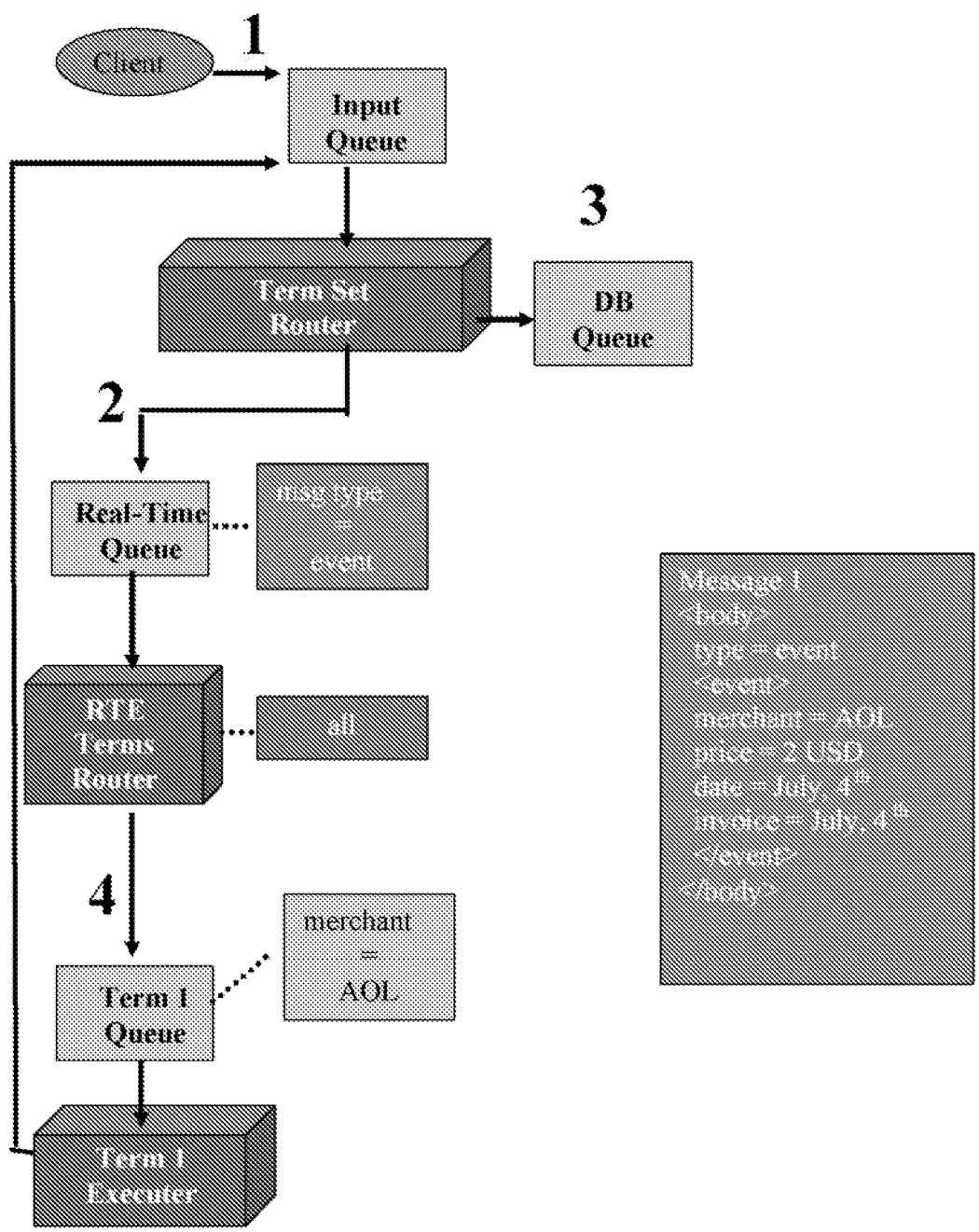
Figure 18:
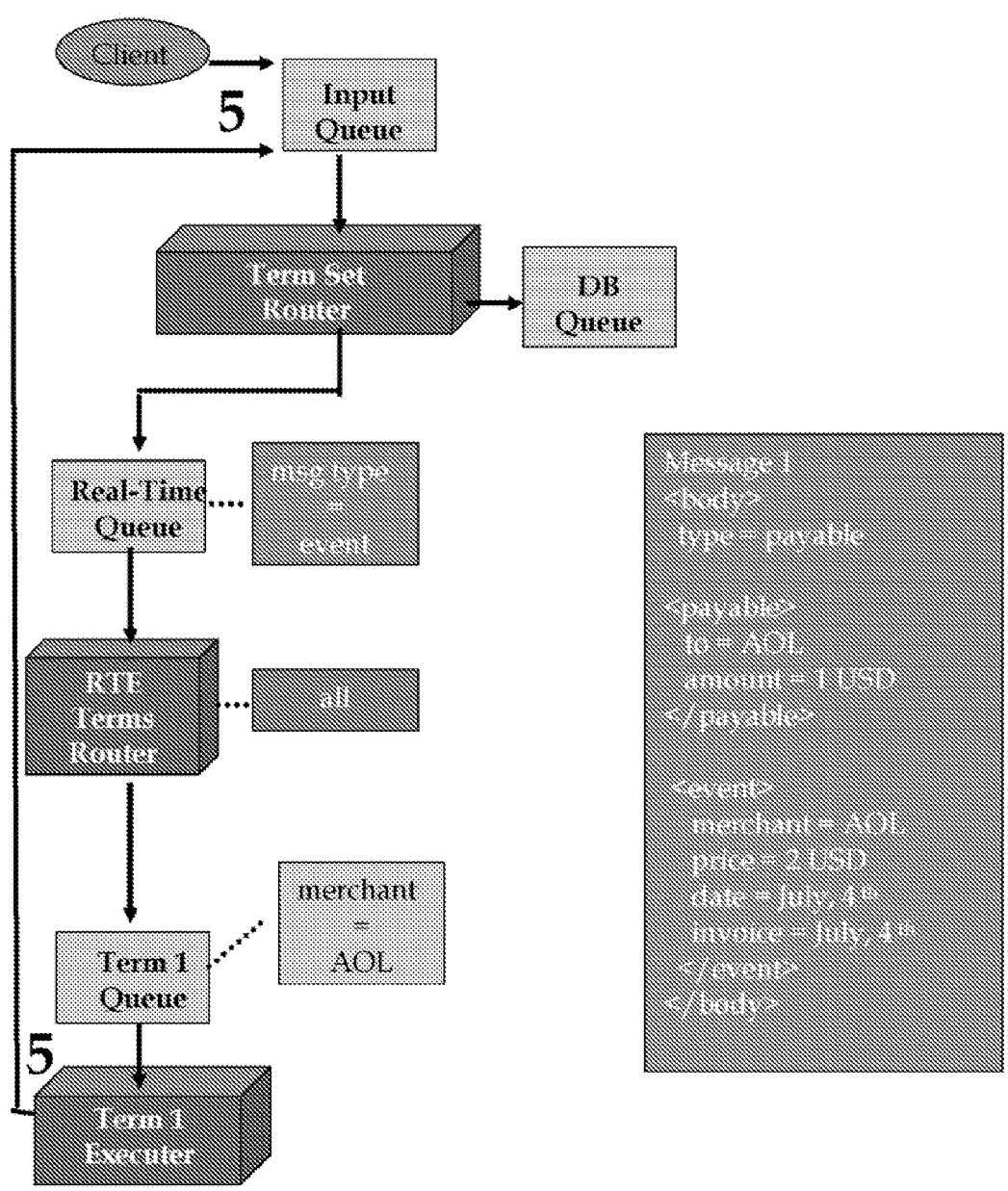
Figure 19:
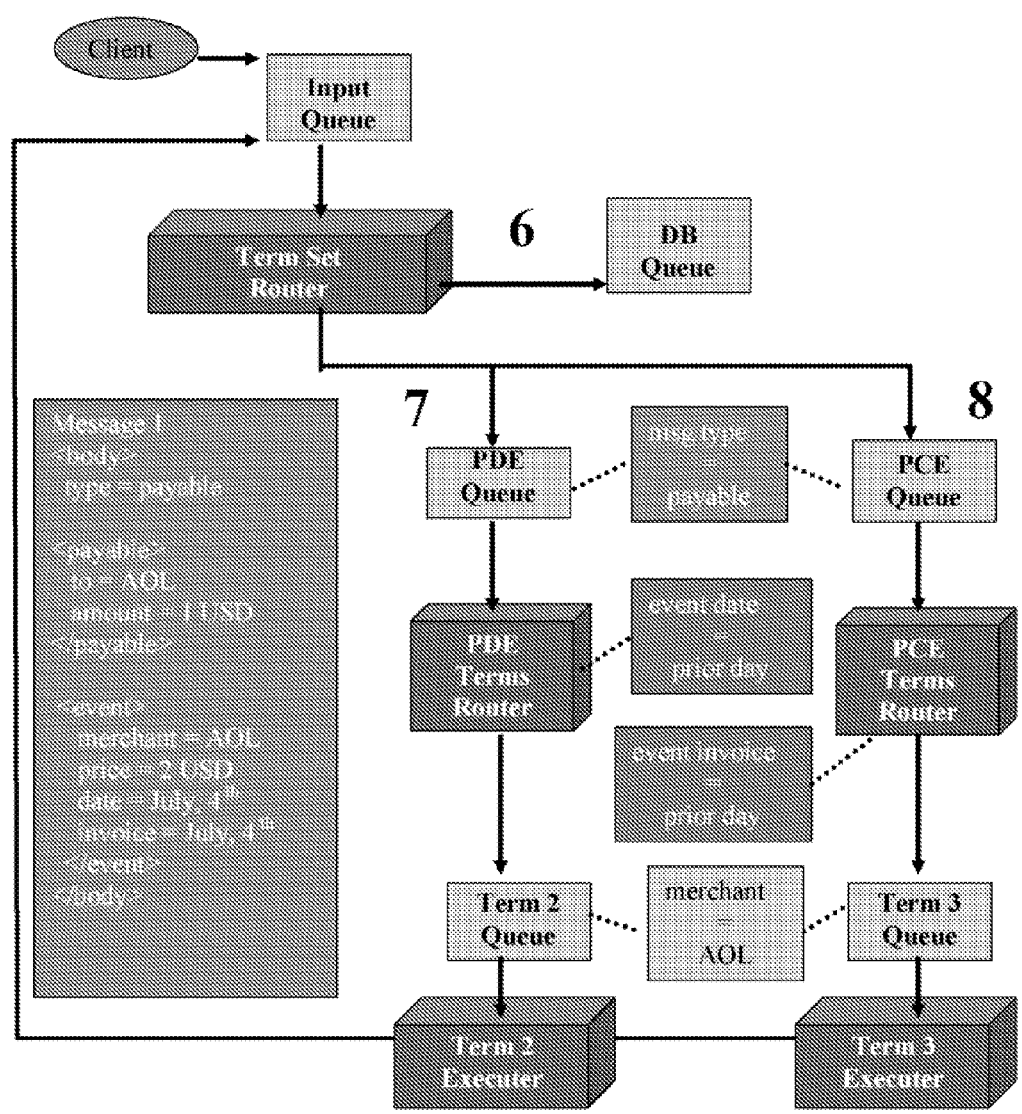
Figure 21:
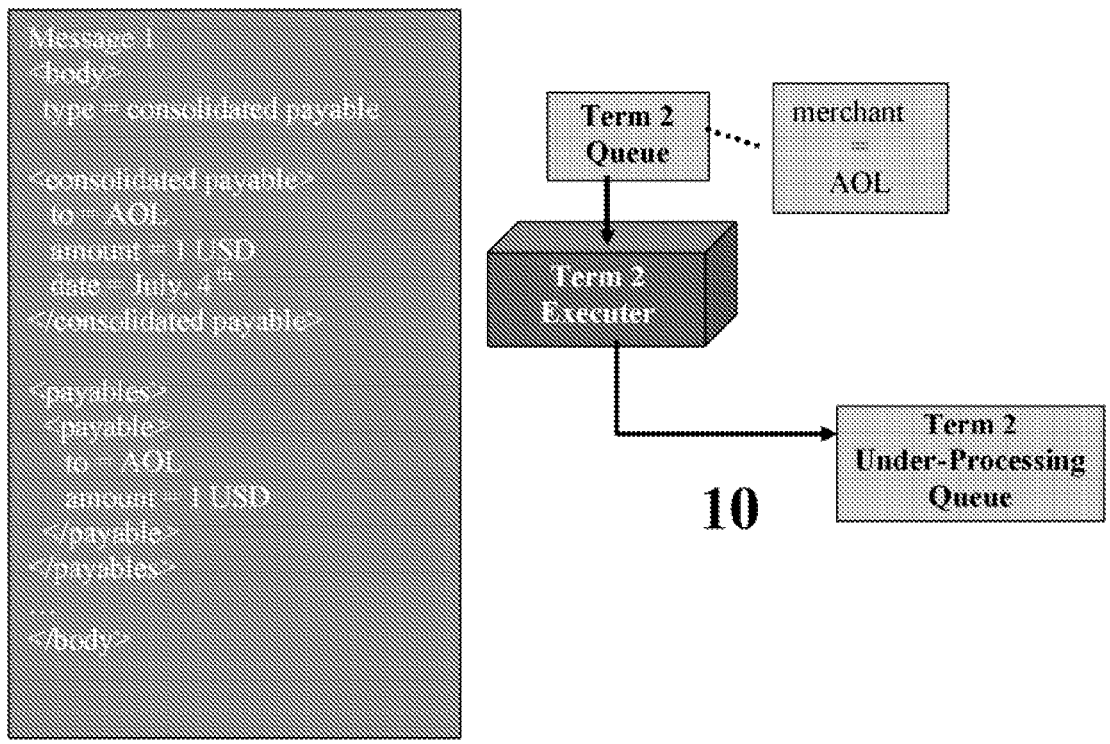
Figure 22:
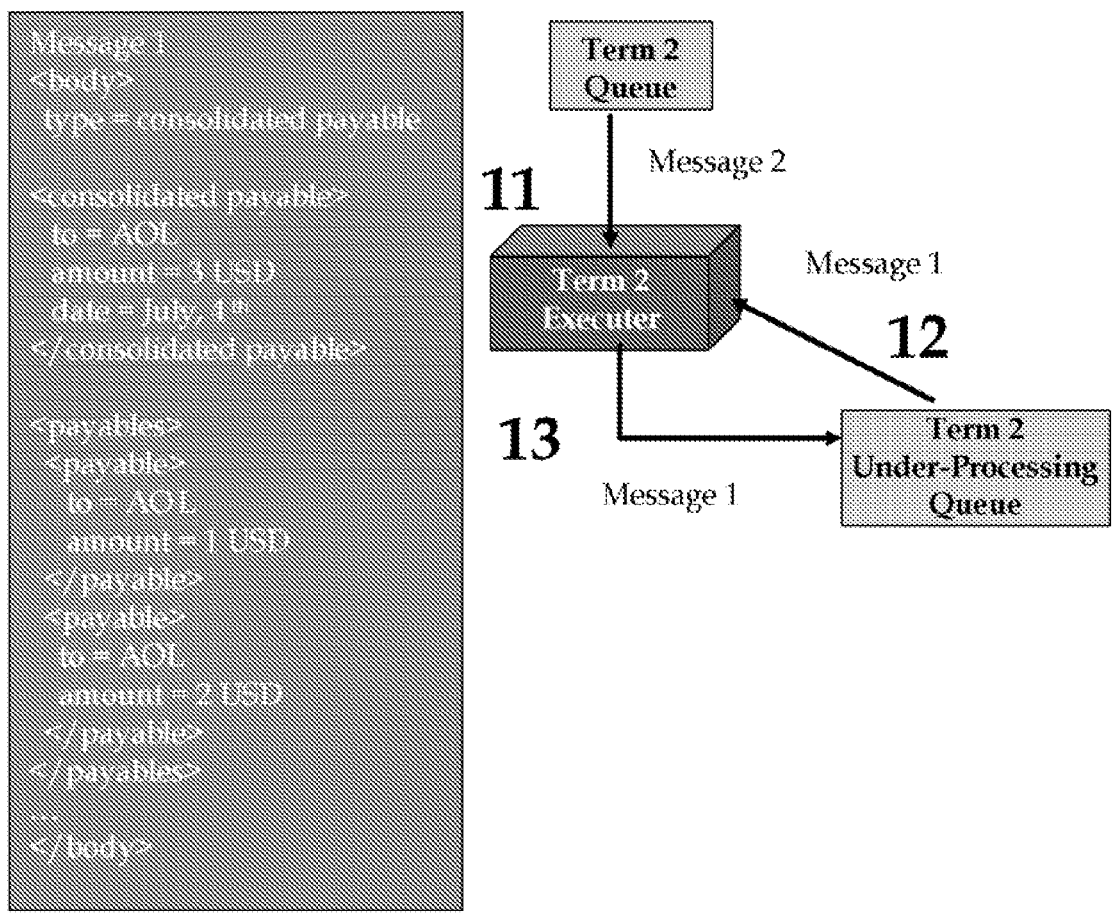

FIGS. 16, 17, 18, 19, 20, 21, and 22 show a use case, which might be used with the contract-execution engine, in some embodiments of the present invention. FIG. 16 shows the term set terms, schedule selectors, and term selectors for the use case, which involves a merchant called AOL. FIG. 17 shows flows 1, 2, 3, and 4 in the initial event message path in the use case. FIG. 18 shows flow 5 in the use case, namely, payable message creation by the Term 1 Executer and the message's path back to the Input Queue. FIG. 19 shows flows 6, 7, and 8 in the use case, namely, the payable message path to both the PDE and PCE queues. FIG. 20 shows flows 7 and 9 in the use case, namely, schedule selection of payable messages 1, 2, and 3 on July $5^{th}$ by the PDE Terms Router. FIG. 21 shows flow 10 of the use case, namely, a consolidated payables (under-processing) message being created by the Term 2 Executer, after processing message 1. FIG. 22 shows flows 11, 12, and 13 of the use case, namely the consolidated payables (under-processing) message being updated or transformed by the Term 2 Executor after processing message 2.

In particular embodiments, the following components are automatically installed at start-up time for contract-execution engine: the general queues (e.g., Input Queue, DB Queue, Missed Events Queue); the term set queues (e.g. RTE Queue, PDE Queue, PME Queue, PCE Queue); the Term Set Router; the Event Updater; the terms routers (e.g., RTE Terms Router, PDE Terms Router, PME Terms Router, PCE Terms Router); the plan templates; and the selector templates.

Also in particular embodiments, the contract-execution engine user provisions participants, plans, and contracts before the engine can start receiving and processing events related to such entities. Further, the user can continuously provision these entities over time. Events that enter the system before the provision of their related participants, plans, or contracts do not get processed and are considered "missed events". During the provisioning process, the entities being entered (or modified) are first validated, persisted into the database, and then a set of elements are installed (or modified) into the system.

In particular embodiments, the following elements are installed at provisioning time as new entities are created: (a) one term queue per contract term, (b) possibly an extra under-processing queue per contract term for the Cumulative Term Plan Template (a consolidation plan template might have an extra queue for persisting the message that holds intermediary calculations), (c) one term executer per contract term, (d) participants, (e) plans, (f) contracts and their terms.

Figure 23:
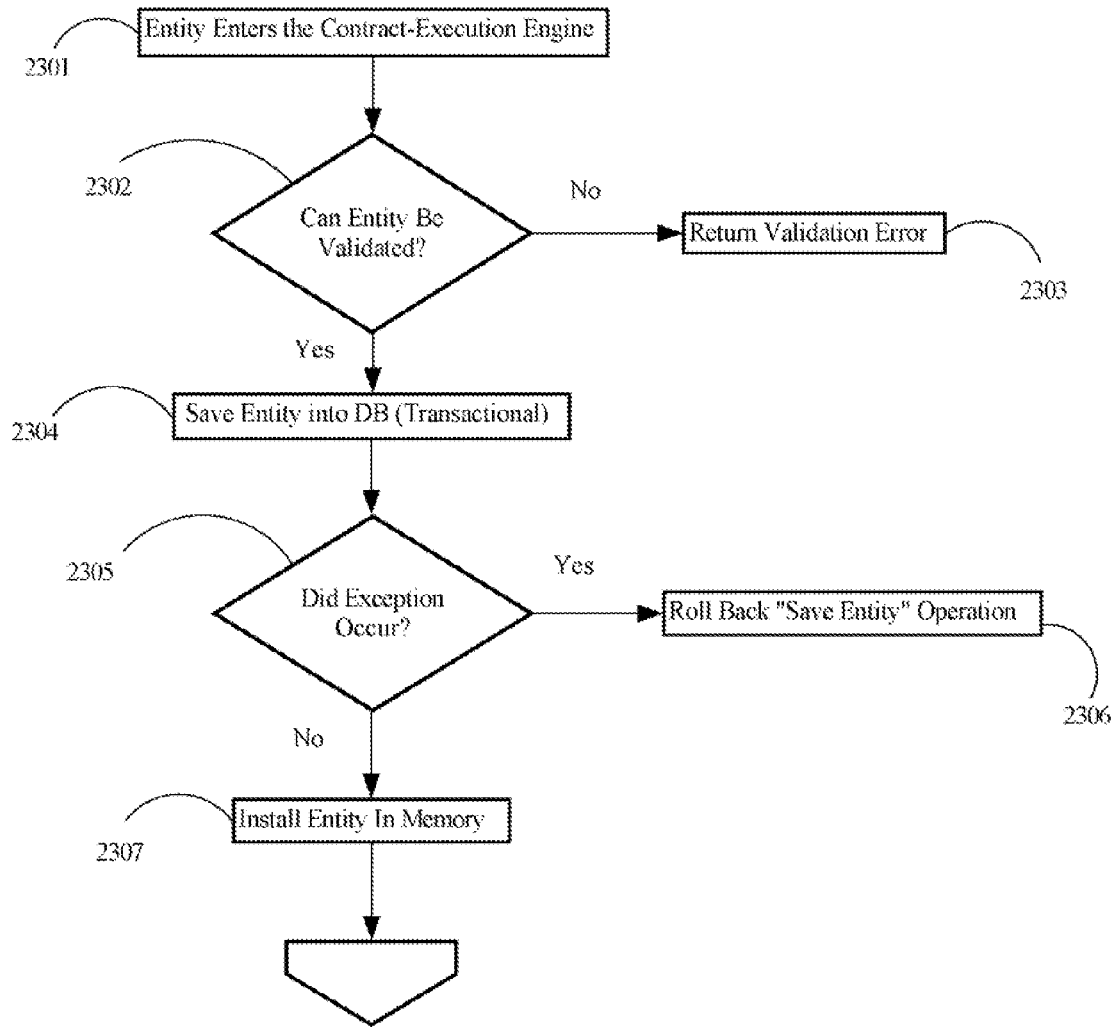
FIG. 23 is a diagram showing a flowchart of a process which might be used when adding an entity to a contract-execution engine, in some embodiments of the present invention.

FIG. 23 is a diagram showing a flowchart of a process which might be used when adding an entity to a con tract-execution engine, in some embodiments of the present invention. In the process's first step 2301, an entity, such as a contract term, enters the contract-execution engine, e.g., from a vertical application. In the next step 2302, the contract-execution engine determines whether the entity can be validated. If not, the contract-execution engine goes to step 2303 and returns a validation error. Otherwise, the contract-execution engine goes to step 2304 and saves the entity into the engine's database, using the transactional processing described above. In step 2305, the contract-execution engine determines whether an exception has occurred. If so, the contract-execution engine goes to step 2306 and rolls back the "Save Entity" operation performed in step 2304. Otherwise, the contract-execution engine goes to step 2307 and installs the entity in memory.

In particular embodiments of the invention, one can reboot the contract-execution engine (for example, after a crash), by re-installing the following elements: the Term Set Router, the Event Saver, the RTE Terms Router, the PDE Terms Router, the PME Terms Router, the PCE Terms Router, the term executers, the plan templates, the selectors, the participants, the plans, and the contracts and their terms.

Particular embodiments of the above-described processes might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many possible orderings of the steps in the processes described above and many possible allocations of those steps between the nodes in a cluster. As a result, the invention is not limited to the specific examples and illustrations discussed above, but only by the following claims and their equivalents.

What is claimed is:

1. A method, comprising:
   receiving a first fact in an inference engine implemented on a cluster of computers, the inference engine having a schedule router, a rule router and a plurality of rule executers;
   storing the first fact in an input queue of the schedule router in response to the receiving of the first fact in the inference engine;
   retrieving, by the schedule router, the first fact from the input queue;
   routing, by the schedule router, the first fact to a first schedule queue of a plurality of schedule queues based on a processing schedule for the first fact and a condition, wherein the condition is associated with the first schedule queue and the schedule router routes the first fact to the first schedule queue in response to a determination that the first fact satisfies the condition associated with the first schedule queue;
   retrieving, by the rule router, the first fact from the first schedule queue in accordance with the processing schedule;
   routing, by the rule router, the first fact to a queue associated with a first rule executer of the plurality of rule executers, wherein the routing is based on contents of the first fact;
   retrieving, by the first rule executer, the first fact from the queue associated with the first rule executer;
   applying, by the first rule executer, an action to the first fact to generate one or more second facts;
   routing, by the first rule executer, the one or more second facts to the input queue of the schedule router; and
   routing, by the first rule executer, the first fact to a device for persistent storage.

2. The method of claim 1, wherein the first fact is routed from the input queue of the schedule router to the first rule executer without waiting for a predetermined schedule time.

3. The method of claim 1, wherein the first fact is routed from the first schedule queue to the first rule executer without waiting for a predetermined schedule time.

4. The method of claim 1, wherein the plurality of schedule queues comprise one or more of a real-time queue, a daily queue, a weekly queue, and a monthly queue.

5. The method of claim 1, wherein the first fact is an XML message.

6. The method of claim 1, wherein the plurality of schedule queues and queues each associated with a corresponding one of the rule executers are implemented via Java Message Service.

7. The method of claim 1, wherein the device for persistent storage includes a database.

8. A method, comprising:
   receiving a first event in a contract execution engine implemented on a cluster of computers, the inference engine having a term set router, at least one term router and a plurality of term executers, the first event associated with a first contract having at least a first term;

storing the first event in an input queue of the term set router in response to the receiving of the first event;

retrieving by the term set router, the first event from the input queue;

routing, by the term set router, the first event to a first term set queue of a plurality of term set queues based on a processing schedule for the first event in accordance with the first term of the first contract;

retrieving, by the term router, the first event from the first term set queue in accordance with the processing schedule;

routing, via the term router, the first event to a term queue associated with a first term executer of the plurality of term executers based on contents of the first event;

retrieving, by the first term executer, the first event from the term queue associated with the first term executer;

executing, by the first term executer, the first event in accordance with a plan associated with the event to generate one or more second events;

routing, by the first term executer, the one or more second events to the input queue of the term set router; and routing, by the first term executer, the first event to a device for persistent storage.

9. The method of claim 8, wherein the term router routes the first event to the term queue associated with the first term executer based at least in part on participants of the first contract.

10. The method of claim 9, wherein data regarding the participants of the first contract for the first event and terms of the first contract associated with the first event are obtained from a database and cached in memory after the retrieving of the first event from the first term set queue.

11. The method of claim 8, wherein the plurality of term set queues comprise one or more of a real-time queue, a daily queue, a monthly queue, and a cycle queue.

12. The method of claim 8, wherein the first event is an XML message.

13. The method of claim 8, wherein the plurality of term set queues and term queues each associated with a corresponding one of the plurality of term executers are implemented via Java Message Service.

14. An apparatus, comprising one or more storage media storing thereon logic for execution by a cluster of computers to implement an inference engine operable, in accordance with the logic, to:

receive a first fact in the inference engine having a schedule router, a rule router and a plurality of rule executers;

store the first fact in an input queue of the schedule router in response to the receiving of the first fact in the inference engine;

retrieve, by the schedule router, the first fact from the input queue;

route, by the schedule router, the first fact to a first schedule queue of a plurality of schedule queues based on a processing schedule for the first fact and a condition, wherein the condition is associated with the first schedule queue and the schedule router routes the first fact to the first schedule queue in response to a determination that the first fact satisfies the condition associated with the first schedule queue;

retrieve, by the rule router, the first fact from the first schedule queue in accordance with the processing schedule;

route, by the rule router, the first fact to a queue associated with a first rule executer of the plurality of rule executers based on contents of the first fact;

retrieve, by the first rule executer, the first ct from the queue associated with the first rule executer;

apply, by the first rule executer, an action to the first fact to generate one or more second facts;

route, by the first rule executer, the one or more second facts to the input queue of the schedule router; and route, by the first rule executer, the first fact to a device for persistent storage.

15. The apparatus of claim 14, wherein the first fact is routed from the input queue of the schedule router to the first rule executer without waiting for a predetermined schedule time.

16. The apparatus of claim 14, wherein the first fact is routed from the first schedule queue to the first rule executer without waiting for a predetermined schedule time.

17. The apparatus of claim 14, wherein the plurality of schedule queues comprise one or more of a real-time queue, a daily queue, a weekly queue, and a monthly queue.

18. The apparatus of claim 14, wherein the first fact is an XML message.

19. The apparatus of claim 14, wherein the plurality of schedule queues and queues each associated with a corresponding one of the rule executers are implemented via Java Message Service.

20. The apparatus of claim 14, wherein the device for persistent storage includes a database.

21. An apparatus, comprising one or more storage media storing thereon logic for execution by a cluster of computers to implement a contract execution engine operable, in accordance with the logic, to:

receive a first event in the contract execution engine having a term set router, at least one term router and a plurality of term executers, the first event associated with a first contract having at least a first term;

store the first event in an input queue of the term set router in response to the receiving of the first event;

retrieve, by the term set router, the first event from the input queue;

route, by the term set router, the first event to a first term set queue of a plurality of term set queues based on a processing schedule for the first event in accordance with the first term of the first contract;

retrieve, by the term router, the first event from the first term set queue in accordance with the processing schedule;

route, by the term router, the first event to a term queue associated with a first term executer of the plurality of term executers based on contents of the first event;

retrieve, by the first term executer, the first event from the term queue associated with the first term executer;

execute, by the first term executer, the first event in accordance with a plan associated with the event to generate one or more second events;

route, by the first term executer, the one or more second events to the input queue of the term set router; and route, by the first term executer, the first event to a device for persistent storage.

22. The apparatus of claim 21, wherein the term router routes the first event to the term queue associated with the first term executer based at least in part on participants of the first contract.

23. The apparatus of claim 22, wherein data regarding the participants of the first contract and terms of the first contract are obtained for the first event from a database and cached in memory after the retrieving of the first event from the first term set queue.

24. The apparatus of claim 21, wherein the plurality of term set queues comprise one or more of a real-time queue, a daily queue, a monthly queue, and a cycle queue.

25. The apparatus of claim 21, wherein the first event is an XML message.

26. The apparatus of claim 21, wherein the plurality of term set queues and term queues each associated with a corresponding one of the plurality of term executers are implemented via Java Message Service.

* * * * *